United States Patent
Ueda et al.

(10) Patent No.: US 9,237,354 B2
(45) Date of Patent: Jan. 12, 2016

(54) VIDEO CODING APPARATUS, VIDEO CODING METHOD AND VIDEO CODING PROGRAM, AND VIDEO DECODING APPARATUS, VIDEO DECODING METHOD AND VIDEO DECODING PROGRAM

(71) Applicant: JVC KENWOOD Corporation, Yokohama-shi (JP)

(72) Inventors: Motoharu Ueda, Yokohama (JP); Satoru Sakazume, Yokohama (JP); Shigeru Fukushima, Yokohama (JP); Toru Kumakura, Yokohama (JP)

(73) Assignee: JVC KENWOOD Corporation, Yokohama-shi (JP)

(*) Notice: Subject to any disclaimer, the term of this patent is extended or adjusted under 35 U.S.C. 154(b) by 645 days.

(21) Appl. No.: 13/630,753

(22) Filed: Sep. 28, 2012

(65) Prior Publication Data

US 2013/0022123 A1 Jan. 24, 2013

Related U.S. Application Data

(63) Continuation of application No. PCT/JP2011/001717, filed on Mar. 24, 2011.

(30) Foreign Application Priority Data

Mar. 31, 2010 (JP) .................................. 2010-083142
Mar. 31, 2010 (JP) .................................. 2010-083143

(51) Int. Cl.
*H04N 7/12* (2006.01)
*G06K 9/36* (2006.01)
(Continued)

(52) U.S. Cl.
CPC ............... *H04N 19/51* (2014.11); *H04N 19/52* (2014.11)

(58) Field of Classification Search
CPC ..... H04N 19/463; H04N 19/70; H04N 19/503; H04N 19/433
USPC ........................................ 375/240.16–240.26
See application file for complete search history.

(56) References Cited

U.S. PATENT DOCUMENTS

2009/0279788 A1* 11/2009 Murata ................. G06T 7/2013
382/199
2010/0172412 A1* 7/2010 Shimada ................ H04N 19/51
375/240.12

(Continued)

FOREIGN PATENT DOCUMENTS

JP 02-062180 A 3/1990
JP 2008-092352 A 4/2008

(Continued)

OTHER PUBLICATIONS

The First Office Action in Chinese Patent Application No. 201180017503.4, dated Oct. 11, 2014.

*Primary Examiner* — Dave Czekaj
*Assistant Examiner* — Tsion B Owens
(74) *Attorney, Agent, or Firm* — Venable LLP; Michael A. Sartori; Todd R. Farnsworth

(57) ABSTRACT

A motion vector detector detects a motion vector from a first reference image for a coding target block. A multiple reference image composition unit creates a composite reference block that a first reference block extracted from the first reference image using the motion vector has been composited with a predetermined region of at least one of other reference images. Setting the composite reference block as a prediction block, an entropy encoder encodes a prediction difference block that the prediction block has been subtracted from the coding target block.

12 Claims, 22 Drawing Sheets

(51) Int. Cl.
*H04N 19/51* (2014.01)
*H04N 19/52* (2014.01)

(56) References Cited

U.S. PATENT DOCUMENTS

2011/0142133 A1* 6/2011 Takahashi ............... H04N 19/52
375/240.16
2011/0170605 A1* 7/2011 Sato ....................... H04N 19/51
375/240.16
2013/0315308 A1* 11/2013 Sugio ..................... H04N 19/52
375/240.14

FOREIGN PATENT DOCUMENTS

JP 2008-154015 A 7/2008
JP 2010-016453 A 1/2010

* cited by examiner

FIG.13

```
Slice_header(){
   .
   .
   INFORMATION TRANSMITTED IN KNOWN METHOD
   .
   .
   .
   if (slice_type != I) {
      refinement_mc_enable                          u(1)
      if (refinement_mc_enable != 0) {
         refinement_mc_adaptive                     u(1)
         refinement_mc_matching_range_full          u(2)
         refinement_mc_matching_subpel              u(2)
      }
   }
}
```

FIG.14

```
Macroblock_layer(){
        .
        .
        .
  INFORMATION TRANSMITTED IN KNOWN METHOD
        .
        .
        .
  if ((mb_type != Intra) && (mb_type != Direct)) {
    for (mbPartIdx = 0; mbPartIdx < NumMbPart( mb_type ); mbPartIdx++) {
      if( ( (refinement_mc_adaptive == 1) && MbPartPredMode( mb_type, mbPartIdx )==Pred_L0 )
         refmc_on_l0[ mbPartIdx ]
    }
    for (mbPartIdx = 0; mbPartIdx < NumMbPart( mb_type ); mbPartIdx++) {
      if( ( (refinement_mc_adaptive == 1) && MbPartPredMode( mb_type, mbPartIdx )==Pred_L1 )
         refmc_on_l1[ mbPartIdx ]
    }
  }
        .
        .
        .
  INFORMATION TRANSMITTED IN KNOWN METHOD
        .
        .
        .
}
```

VIDEO CODING APPARATUS, VIDEO CODING METHOD AND VIDEO CODING PROGRAM, AND VIDEO DECODING APPARATUS, VIDEO DECODING METHOD AND VIDEO DECODING PROGRAM

BACKGROUND OF THE INVENTION

1. Field of the Invention

The present invention relates to a coding technology and a decoding technology of a video signal.

2. Description of the Related Art

In recent years, a service to distribute digitized image and audio contents via a broadcast wave such as a satellite and a ground wave, and a network has been realized, and a highly-efficient coding technology for efficiently recording and transmitting contents having a massive amount of information is being required. Used as the highly-efficient video coding is a method for compressing information using a correlation between spatially adjacent pixels in the same frame of a video signal, and correlations between temporally adjacent frames and fields, as represented by MPEG-4 AVC.

In MPEG-4 AVC, used as compression using a temporal correlation is motion compensated prediction to use a locally decoded image of an already-coded frame as a reference image for a target image being a coding target frame, detect the amount of motion (hereinafter described as "motion vector") between the target image and the reference image in units of two-dimensional blocks (hereinafter described as "target blocks") of a predetermined size, and create a prediction image based on the target block and the motion vector.

In MPEG-4 AVC, it is possible to improve the prediction accuracy of motion compensated prediction by using a prediction method using a motion vector of each target block by making the size of a target block variable in a two-dimensional block of 16×16 pixels being the unit of an encoding process (hereinafter described as "macroblock"), a method for storing a plurality of reference images to select a reference image to be used for prediction, and a method for obtaining motion vectors between two reference images and a target block to create a motion estimated image, and accordingly a reduction in the amount of information is realized.

Moreover, it is necessary in motion compensated prediction to encode and transmit a created motion vector. In order to prevent an increase in the amount of information due to motion vectors, a predicted motion vector value that is predicted from motion vectors for already-decoded blocks around the target block is used for coding; accordingly, it is possible to use motion compensated prediction called a direct mode that does not transmit a motion vector.

However, since the above prediction of motion vectors cannot necessarily be obtained with high accuracy, a method for detecting a motion vector between reference images on both of the coding and decoding sides, assuming that the motion vector is temporally continuous, creating the predicted motion vector of a target block, and configuring the direct mode is also presented as shown in Patent Document 1.

CITATION LIST

Patent Literature

Patent Document 1: Japanese Patent Application Laid-Open No. 2008-154015

The following problems have not been solved in motion compensated prediction in known video coding as represented by MPEG-4 AVC. Accordingly, an improvement in coding efficiency is prevented.

A first problem is reduction in the quality of a motion compensated prediction image due to the degradation of the quality of a decoded image to be used as a reference image, and especially when high compression coding is performed, a degradation component mixed in the motion compensated prediction image decreases prediction accuracy, and it is necessary to encode information for restoring the degradation component as a prediction difference, and the amount of information increases.

A second problem is a point that in a video signal having little temporal and spatial continuity of motion, the accuracy of motion vector prediction is not sufficient, and the quality of a prediction image upon using the direct mode is poor and motion compensated prediction does not function effectively. This degradation is caused if adjacent blocks straddling a target object have different motions. If motion is temporally large, a motion vector to be used for prediction represents a block at a position that has moved from the original target block corresponding to the motion. Accordingly, this degradation is caused. Moreover, if the motion changes temporally, prediction does not come true similarly, and degradation is caused.

A third problem is an increase in the amount of coding that is necessary for the transmission of a motion vector upon using prediction using two reference images and motion compensated prediction in units of small blocks. If two reference images are used, the smoothing of prediction degradation is performed by adding reference images, and it is possible to reduce the influence of the degradation component. However, it becomes necessary to transmit motion vectors accordingly, and the amount of coding increases. Moreover, it becomes possible to obtain appropriate motion in accordance with the boundary of an object also in motion compensation in units of small blocks, and the accuracy of a prediction image improves. However, it becomes necessary to transmit motion vectors in small units, and the amount of coding increases.

Patent Document 1 is the method presented to solve the above second problem. However, if motion is spatially uniform, the motion is one where the motion vector obtained between reference images passes the position of the target block; accordingly, the accuracy of motion vector prediction increases. However, if motion is not spatially uniform, the motion vector is a predicted motion vector obtained without using the information of the target block and therefore the motion becomes different from that of the target block and prediction does not fully come true. Moreover, in order to capture a large motion, both of a coding and a decoding apparatus need the process of detecting a motion vector over a wide area between reference images, and there arises a problem that the amount of computation increases.

SUMMARY OF THE INVENTION

The present invention has been made considering these circumstances, and an object thereof is to provide a technology of suppressing an increase in the amount of computation in a coding and a decoding apparatus while improving the quality of a prediction image to improve the efficiency of motion compensated prediction.

In order to solve the above problems, a video coding apparatus according to an aspect of the present invention includes: a motion vector detector configured to detect a motion vector from a first reference image for a coding target block; a reference image composition unit configured to create a composite reference block that a first reference block extracted from the first reference image using the motion vector has been composited with a predetermined region of at least one of other reference images; and a coding unit configured to code a prediction difference block that a prediction block has been subtracted from the coding target block, setting the composite reference block as the prediction block.

According to the aspect, it is possible to create a motion compensated prediction image having few prediction residuals, where the quality of a prediction image has been increased, without increasing the amount of motion vector information to be transmitted, by obtaining a motion vector between the coding target block and the first reference image, and compositing a reference image on which motion compensated prediction has been performed, and at least one of other reference images.

According to another aspect of the present invention, there is provided a video coding apparatus. This apparatus includes: a motion vector detector configured to detect a first motion vector from a first reference image for a coding target block; a reference image composition unit configured to create a composite reference block that a first reference block of a specific region having a size equal to the coding target block or larger, the first reference block having been extracted from the first reference image using the first motion vector, has been composited with a predetermined region of at least one of other reference images; a motion compensated prediction unit configured to detect a second motion vector corresponding to the coding target block for the composite reference block by searching the specific region in the composite reference block, extract a block of the same size as the coding target block from the composite reference block using the second motion vector, and set the extracted block as a prediction block; and a coding unit configured to code a prediction difference block that the prediction block has been subtracted from the coding target block, and the second motion vector.

According to this aspect, it is possible to create a motion compensated prediction image having few prediction residuals, where the quality of a prediction image was improved and subsequently phase shifts of edge parts and the like after the improvement were corrected, by obtaining a motion vector between the coding target block and the first reference image, and compositing a reference image on which motion compensated prediction has been performed, and at least one of other reference images, and detecting (correcting) a motion vector in a minute range in the composited prediction image.

The accuracy of the first motion vector may be N pixel accuracy (N is a real number), and the accuracy of the second motion vector may be M pixel accuracy (M is a real number: M<N). The specific region may have a region equal to a target block±N/2 pixel or more, relative to a position in the first reference image, the position being pointed by the first motion vector or a vector value that has converted the first motion vector to N pixel accuracy (N is a real number), and a range to detect the second motion vector may be within a range of ±N/2 with respect to the first motion vector value.

According to the configuration, assuming that the accuracy of the motion vector obtained for the first reference image is N pixel accuracy, the range of motion vector detection (correction) to be performed on the composited prediction image is set to ±N/2 pixel to make a correction at higher accuracy than N pixels and transmit a motion vector value that is the correction result; accordingly, it is possible to acquire, with one motion vector value, a motion compensated prediction image from the first reference image, and a motion compensated prediction image where the phase shift of the composited prediction image has been corrected, on the decoding apparatus side.

The reference image composition unit may include an inter-reference image motion vector detector configured to detect a third motion vector between the first reference block and a second reference image being another reference image. The reference image composition unit may calculate an average value or weighted average value on a pixel basis between a second reference block extracted from the second reference image using the third motion vector, and the first reference block to create the composite reference block.

According to the configuration, a motion vector value in between with another reference image is obtained for the motion compensated prediction image predicted using the first reference image, and the average between the predicted motion compensated prediction image and a motion compensated prediction image obtained from the another reference image is taken; accordingly, it is possible to create a prediction image that has dealt with the removal of a coding degradation component and a minute change in luminance of a coding target object, and it is possible to improve coding efficiency.

The inter-reference image motion vector detector may detect a plurality of the third motion vectors between the first reference block and the second reference image in units of blocks smaller than the first reference block. The reference image composition unit may combine a plurality of the second reference blocks in units of small blocks, the second reference blocks having been extracted from the second reference image using the plurality of the third motion vectors, and may calculate an average value or weighted average value in between with the first reference block on a pixel basis, and accordingly may create the composite reference block.

According to the configuration, for a motion compensated prediction image predicted using the first reference image, motion vector values in between with another reference image in smaller units than that of the target motion compensated prediction image are obtained, and the process of compositing the predicted motion compensated prediction image and motion compensated prediction images acquired in smaller units in accordance with the respective motion vectors is performed; accordingly, it is possible to create a prediction image that has dealt with a minute temporal transformation of the object of a coding target object without increasing the amount of motion vector information to be transmitted, and it is possible to improve coding efficiency.

The inter-reference image motion vector detector may search within a predetermined range for motion, centering a motion vector value that the first motion vector has been converted in accordance with two of a first time difference between the first reference image and the coding target block and a second time difference between the second reference image and the coding target block, to detect the third motion vector.

A video decoding apparatus according to still another aspect of the present invention includes: a motion vector decoder configured to decode a motion vector for a decoding target block from a coded stream; a reference image composition unit configured to create a composite reference block that a first reference block extracted from a first reference image using a motion vector has been composited with a predetermined region of at least one of other reference images; and a decoding unit configured to create a decoded image by setting the composite reference block as a prediction block, and adding the prediction block and a prediction difference block decoded from the decoding target block.

According to this aspect, a reference image on which motion compensated prediction has been performed based on a motion vector between the decoding target block and the first reference image decoded from the coded stream is composited with another reference image; accordingly, it is possible to create a motion compensated prediction image where the quality of the prediction image has been improved.

According to still another aspect of the present invention, there is provided a video decoding apparatus. This apparatus includes: a motion vector decoder configured to decode a first motion vector for a decoding target block from a coded stream; a motion vector separation unit configured to create a second motion vector based on the first motion vector; a reference image composition unit configured to create a composite reference block that a first reference block of a specific region having a size equal to the decoding target block or larger, the first reference block having been extracted from a first reference image using the second motion vector, has been composited with a predetermined region of at least one of other reference images; a motion compensated prediction unit configured to extract a block of the same size as the decoding target block from the composite reference block using the first motion vector and set the extracted block as a prediction block; and a decoding unit configured to create a decoded image by adding the prediction block and a prediction difference block decoded from the decoding target block.

According to this aspect, a reference image on which motion compensated prediction has been performed based on a motion vector between the decoding target block and the first reference image decoded from the coded stream is composited with another reference image, and a motion vector is corrected in a minute range in the composited prediction image; accordingly, it is possible to create a motion compensated prediction image where the quality of the prediction image was improved and subsequently phase shifts of edge parts and the like after the improvement were corrected.

In the motion vector separation unit, the accuracy of the inputted first motion vector may be M pixel accuracy (M is a real number), the accuracy of the second motion vector to be created may be N pixel accuracy (N is a real number: N>M), and the second motion vector may be a value that the first motion vector has been converted to N pixel accuracy. The specific region may have a region of a target block±N/2 pixel or more, relative to the position in the first reference image, the position being pointed by the second motion vector.

According to the configuration, assuming that the accuracy of the decoded motion vector is M pixel accuracy, the motion vector is converted to N pixel accuracy that is coarser than M pixels, and the process of compositing the reference image on which motion compensated prediction has been performed and another reference image is performed with the converted motion vector value as a reference. Accordingly, it is made possible that the same composite process as that of the coding apparatus is performed on the decoding side. A difference value between the converted motion vector value and the received motion vector value is used as a phase correction value of the composited motion compensated prediction image. Accordingly, it is possible to acquire a motion compensated prediction image having few prediction residuals, which was created on the coding apparatus side, with one motion vector value on the decoding apparatus.

The reference image composition unit may include an inter-reference image motion vector detector configured to detect a third motion vector between the first reference block and a second reference image being another reference image. The reference image composition unit may calculate an average value or weighted average value on a pixel basis between a second reference block extracted from the second reference image using the third motion vector, and the first reference block to create the composite reference block.

According to the configuration, a motion vector value between a motion compensated prediction image predicted using the first reference image and another reference image is obtained, and the average between the predicted motion compensated prediction image and a motion compensated prediction image acquired from the another reference image is taken. Accordingly, it is possible to create a prediction image that has dealt with the removal of a coding degradation component and a minute change in luminance of a decoding target object, and it is possible to improve coding efficiency.

The inter-reference image motion vector detector may detect a plurality of the third motion vectors between the first reference block and the second reference image in units of blocks smaller than the first reference block. The reference image composition unit may combine a plurality of the second reference blocks in units of small blocks, the second reference blocks having been extracted from the second reference image using the plurality of the third motion vectors, and may calculate an average value or weighted average value in between with the first reference block on a pixel basis, and accordingly may create the composite reference block.

According to the configuration, for a motion compensated prediction image predicted using the first reference image, motion vector values in between with another reference image in smaller units than that of the target motion compensated prediction image are obtained, and the process of compositing the predicted motion compensated prediction image and motion compensated prediction images acquired in smaller units in accordance with the respective motion vectors is performed; accordingly, it is possible to create a prediction image that has dealt with a minute temporal transformation of the object of a decoding target object, and it is possible to improve coding efficiency.

The inter-reference image motion vector detector may search within a predetermined range for motion, centering a motion vector value that the second motion vector has been converted in accordance with two of a first time difference between the first reference image and the decoding target block and a second time difference between the second reference image and the decoding target block, to detect the third motion vector.

Arbitrary combinations of the above elements and those that the expressions of the present invention are converted between methods, apparatuses, systems, recording media, computer programs, and the like are also effective as embodiments of the present invention.

BRIEF DESCRIPTION OF THE DRAWINGS

FIG. 13 is a view of an example of additional information to a slice header in the second embodiment of the present invention;

FIG. 14 is a view of an example of additional information to a motion compensated prediction mode in the second embodiment of the present invention;

DETAILED DESCRIPTION OF THE INVENTION

The invention will now be described by reference to the preferred embodiments. This does not intend to limit the scope of the present invention, but to exemplify the invention.

A description will hereinafter be given of embodiments of the present invention with reference to the drawings.

First Embodiment

Figure 1:
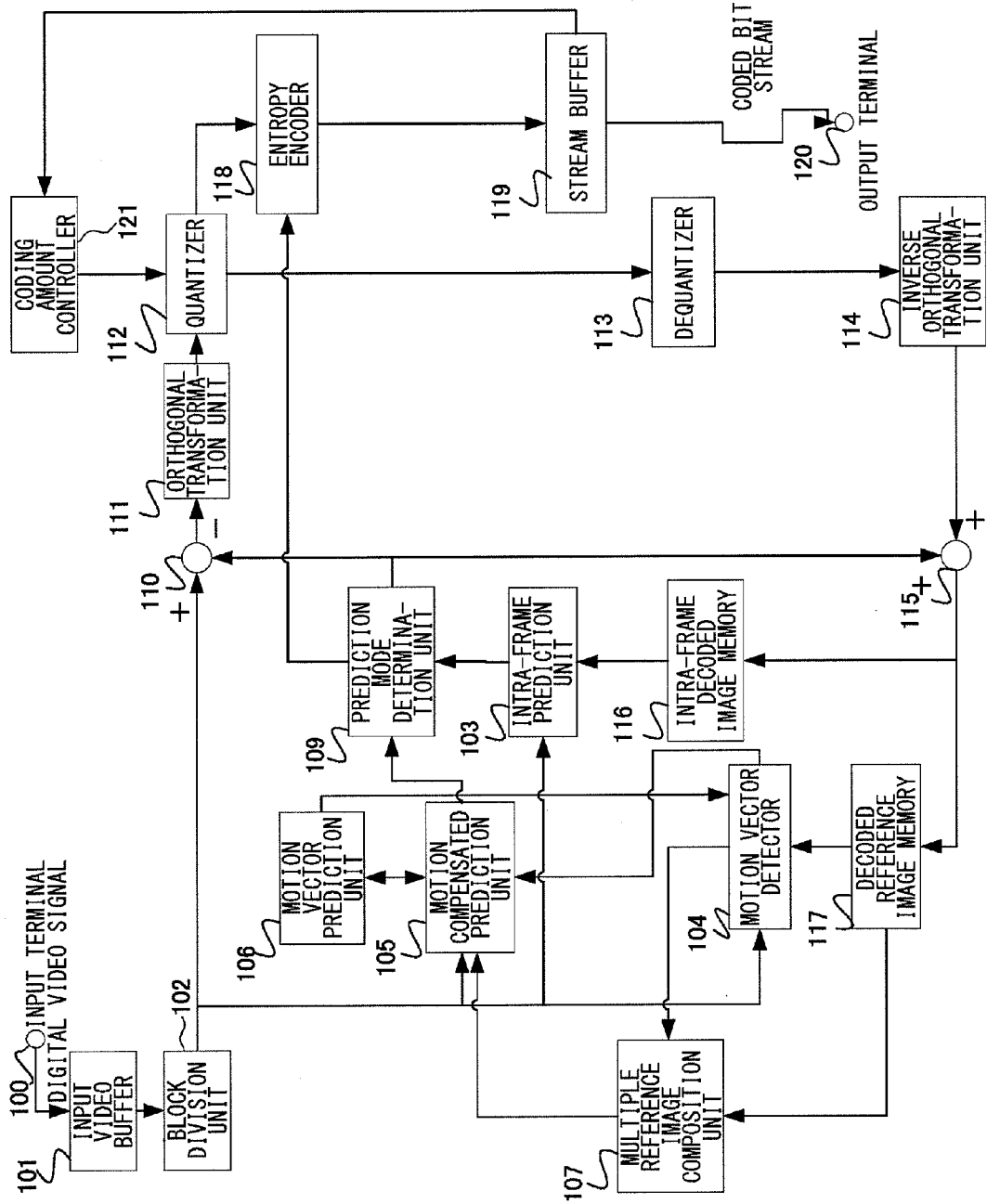
FIG. 1 is a block diagram of the configuration of a video coding apparatus of a first embodiment of the present invention.

Firstly, a description will be given of a video coding apparatus of a first embodiment. FIG. 1 is a block diagram of the configuration of the video coding apparatus of the first embodiment.

As depicted in FIG. 1, the video coding apparatus of the first embodiment includes an input terminal 100, an input video buffer 101, a block division unit 102, an intra-frame prediction unit 103, a motion vector detector 104, a motion compensated prediction unit 105, a motion vector prediction unit 106, a multiple reference image composition unit 107, a prediction mode determination unit 109, a subtractor 110, an orthogonal transformation unit 111, a quantizer 112, a dequantizer 113, an inverse orthogonal transformation unit 114, an adder 115, an intra-frame decoded image memory 116, a decoded reference image memory 117, an entropy encoder 118, a stream buffer 119, an output terminal 120, and a coding amount controller 121.

The first embodiment of the present invention is characterized by providing the multiple reference image composition unit 107, and the operation in this processing block and the motion compensated prediction unit 105. With respect to the other processing blocks, it is possible to apply the same processes as processing blocks configuring an encoding process in the video coding apparatus, such as MPEG-4 AVC.

A digital video signal inputted from the input terminal 100 is stored in the input video buffer 101. The digital video signal stored in the input video buffer 101 is supplied to the block division unit 102, and is cut in units of macroblocks each constructed of 16×16 pixels as coding target blocks. The block division unit 102 supplies the cut coding target block to the intra-frame prediction unit 103, the motion vector detector 104, the motion compensated prediction unit 105, and the subtractor 110.

The coding target block inputted by the block division unit 102 and a decoded image of a region where coding for the surroundings of the coding target block is complete, the decoded image being stored in the intra-frame decoded image memory 116, is inputted into the intra-frame prediction unit 103 to make a prediction using a correlation in the frame. For example, using a method called intra prediction that predicts pixel values of the coding target block in a plurality of predetermined directions in units of 4×4 pixels, 8×8 pixels, and 16×16 pixels, and creates a prediction image together with information indicating the unit of the prediction process and the selected direction (intra prediction mode), a prediction is made using a correlation between adjacent pixels in the screen. The prediction image and the selected intra prediction mode are outputted from the intra prediction unit 103 to the prediction mode determination unit 109.

The coding target block inputted by the block division unit 102 and a decoded image, as a reference image, of a frame where the coding of the entire screen is complete, the decoded image being stored in the decoded reference image memory 117, are inputted into the motion vector detector 104 to perform motion estimation between the coding target block and the reference image. Used as a general motion estimation process is a block matching process of cutting out a reference image at a position moved by a predetermined amount of movement from the same position in the screen, and obtaining the amount of movement, assuming that the amount of movement having the smallest prediction error upon setting the image as a prediction block is a motion vector value, while changing the amount of movement. The detected motion vector value is outputted to the motion compensated prediction unit 105 and the multiple reference image composition unit 107.

The motion compensated prediction unit 105 receives the input of the motion vector value obtained by the motion vector detector 104, and creates a motion compensated prediction image for a plurality of reference images in relation to each of a plurality of block sizes equal to 16×16 or smaller, selects a prediction signal having the least difference information to be encoded for the coding target block inputted by the block division unit 102, and selects a prediction signal having the least difference information to be encoded, also including, as a candidate of a prediction signal, the composited reference image signal inputted by the multiple reference image composition unit 107. The motion compensated prediction unit 105 outputs the selected motion compensated prediction mode and the prediction signal to the prediction mode determination unit 109. The motion compensated prediction mode includes mode information indicating whether to be motion compensation using the composited reference image.

The motion vector prediction unit 106 uses the motion vectors of the surrounding already-coded blocks to calculate a predicted motion vector value, and supplies the predicted motion vector value to the motion vector detector 104 and the motion compensated prediction unit 105.

Using the predicted motion vector value, the motion vector detector 104 takes into account a coding amount required when a difference between the motion vector prediction value and the motion vector value is encoded, and detects an optimal motion vector value. Similarly, the motion compensated prediction unit 105 takes into account a coding amount required when a difference between the motion vector prediction value and the motion vector value is encoded, and selects an optimal block unit of motion compensated prediction, and a reference image and a motion vector value, which will be used.

The multiple reference image composition unit 107 receives the inputs of a motion vector value for one reference image outputted from the motion vector detector 104, and a plurality of reference images stored in the decoded reference image memory 117, and performs a reference image composition process using the plurality of reference images. The composited reference image signal is outputted to the motion compensated prediction unit 105. The detailed operation of the multiple reference image composition unit 107 will be described later.

The prediction mode determination unit 109 selects a prediction signal having the least difference information to be encoded for the coding target block inputted by the block division unit 102, based on a prediction mode and a prediction image for each prediction method inputted by the intra-frame prediction unit 103 and the motion compensated prediction unit 105 and outputs a prediction image block in the selected prediction method to the subtractor 110 and the adder 115, and outputs prediction mode information and information requiring coding in accordance with the prediction mode as additional information to the entropy encoder 118.

The subtractor 110 computes a difference between the coding target block supplied from the block division unit 102 and the prediction image block supplied from the prediction mode determination unit 109 and supplies the result as a difference block to the orthogonal transformation unit 111.

The orthogonal transformation unit 111 performs DCT transform on the difference block in units of 4×4 pixels or 8×8 pixels. Accordingly, DCT coefficients corresponding to frequency component signals on which the orthogonal transformation has been performed are generated. Moreover, the orthogonal transformation unit 111 outputs the generated DCT coefficients of each macroblock together to the quantizer 112.

The quantizer 112 performs a quantization process by dividing the DCT coefficient by a value different between each frequency component. The quantizer 112 supplies the quantized DCT coefficient to the dequantizer 113 and the entropy encoder 118.

The dequantizer 113 multiplies the quantized DCT coefficient inputted by the quantizer 112 by the value divided upon quantization to perform dequantization, and outputs the dequantized result as the decoded DCT coefficient to the inverse orthogonal transformation unit 114.

The inverse orthogonal transformation unit 114 performs an inverse DCT process to create the decoded difference block. The inverse orthogonal transformation unit 114 supplies the decoded difference block to the adder 115.

The adder 115 adds the prediction image block supplied from the prediction mode determination unit 109 and the decoded difference block supplied from the inverse orthogonal transformation unit 114 to create a locally decoded block. The locally decoded block created by the adder 115 is stored in the intra-frame decoded image memory 116 and the decoded reference image memory 117 in a state where an inverse block transformation has been performed. In the case of MPEG-4 AVC, the process of adaptably performing filtering on a block boundary where coding distortions of each block easily appear as a boundary may be performed before the locally decoded block is inputted into the decoded reference image memory 117.

The entropy encoder 118 performs variable-length coding on each of the quantized DCT coefficients supplied from the quantizer 112, prediction mode information and information requiring coding in accordance with the prediction mode, which have been supplied from the prediction mode determination unit 109. Specifically, the information requiring coding is: the intra-prediction mode and prediction block size information in the case of intra-frame prediction; and is a prediction block size, specification information of a reference image, and a difference value between a motion vector and a predicted motion vector value in the case of motion compensated prediction and composite image motion compensated prediction. The entropy encoder 118 outputs to the stream buffer 119 the information on which variable-length coding has been performed as the coded bit stream.

The coded bit stream accumulated in the stream buffer 119 is outputted to a recording medium or transmission channel via the output terminal 120. With respect to the coding amount control of the coded bit stream, the coding amount of the coded bit stream accumulated in the stream buffer 119 is supplied to the coding amount controller 121, and is compared with a target coding amount. The fineness of quantization (quantization scale) of the quantizer 112 is controlled to bring the coding amount near to the target coding amount.

Figure 2:
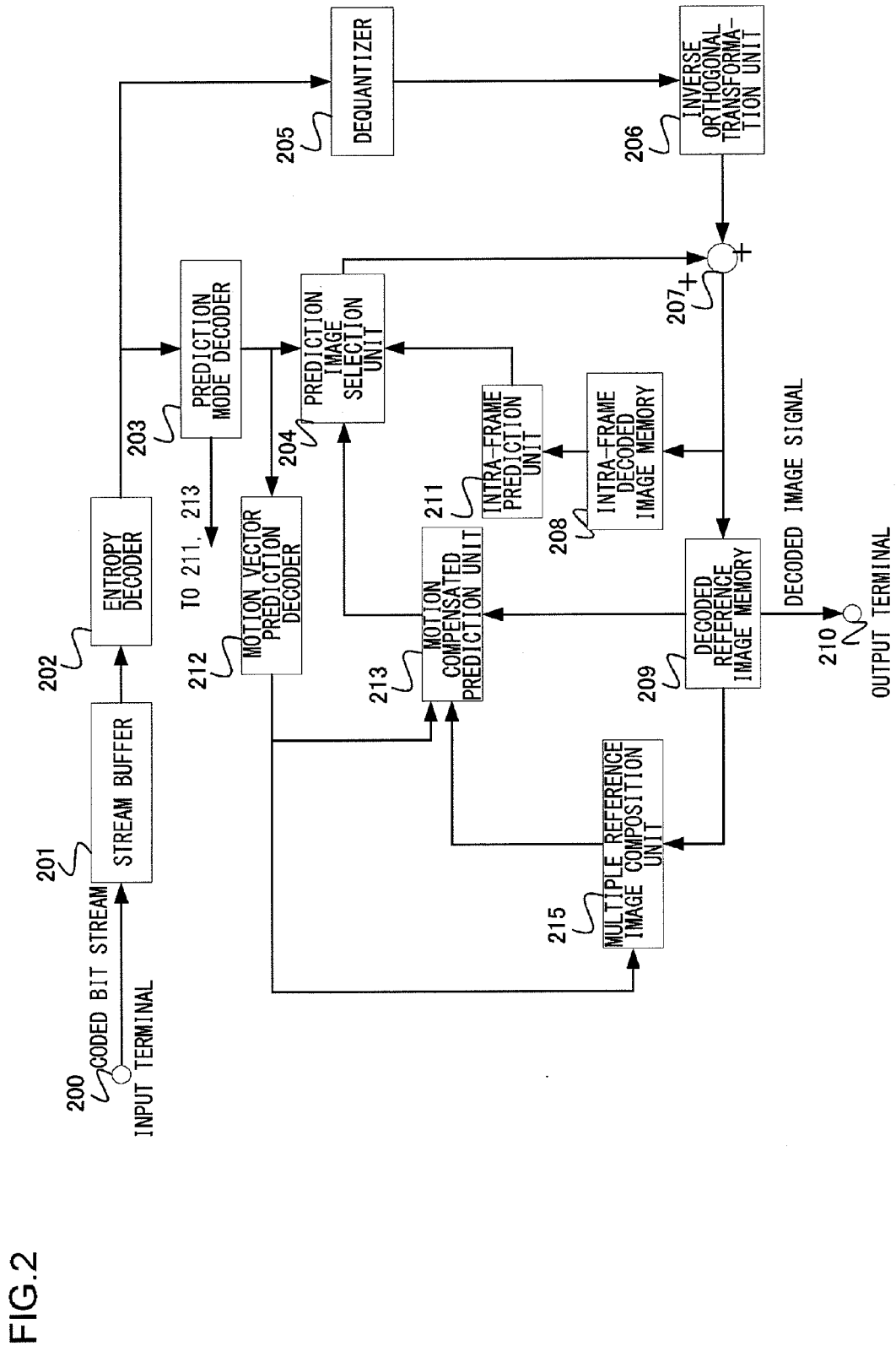
FIG. 2 is a block diagram of the configuration of a video decoding apparatus of the first embodiment of the present invention.

Next, a description will be given of a video decoding apparatus that decodes the coded bit stream generated by the video coding apparatus of the first embodiment. FIG. 2 is a configuration diagram of the video decoding apparatus of the first embodiment.

As depicted in FIG. 2, the video decoding apparatus of the first embodiment includes an input terminal 200, a stream buffer 201, an entropy decoder 202, a prediction mode decoder 203, a prediction image selection unit 204, a dequantizer 205, an inverse orthogonal transformation unit 206, an adder 207, an intra-frame decoded image memory 208, a decoded reference image memory 209, an output terminal 210, an intra-frame prediction unit 211, a motion vector prediction decoder 212, a motion compensated prediction unit 213, and a multiple reference image composition unit 215.

The first embodiment of the present invention is characterized by providing the multiple reference image composition unit 215 and the operation in this processing block and the motion compensated prediction unit 213. With respect to the other processing blocks, it is possible to apply the same processes as processing blocks configuring a decoding process in the video coding apparatus, such as MPEG-4 AVC.

The coded bit stream inputted from the input terminal 200 is supplied to the stream buffer 201, accommodates the changes in the coding amount of the coded bit stream in the stream buffer 201, and is supplied to the entropy decoder 202 in a predetermined unit such as a frame. The entropy decoder 202 performs variable-length decoding on the encoded prediction mode information and additional information in accordance with the prediction mode, and the quantized DCT coefficients from the coded bit stream inputted via the stream buffer 201, and outputs the quantized DCT coefficients to the dequantizer 205 and the prediction mode information and the additional information in accordance with the prediction mode to the prediction mode decoder 203.

With respect to the dequantizer 205, the inverse orthogonal transformation unit 206, the adder 207, the intra-frame decoded image memory 208, and the decoded reference image memory 209, similar processes to those of the dequantizer 113, the inverse orthogonal transformation unit 114, the adder 115, the intra-frame decoded image memory 116, and the decoded reference image memory 117, which are local decoding processes of the video coding apparatus of the first embodiment of the present invention are performed. A decoded image accumulated in the intra-frame decoded image memory 208 is displayed as a decoded image signal on a display device via the output terminal 210.

If motion compensated prediction or composite motion compensated prediction is selected as a prediction mode based on the prediction mode information and the additional information in accordance with the prediction mode, which have been inputted by the entropy decoder 202, the prediction mode decoder 203 outputs to the motion vector prediction decoder 212 the motion compensated prediction mode or composite image motion compensated prediction mode that is information indicating the predicted unit of a block, and the decoded difference vector value, and outputs the prediction mode information to the prediction image selection unit 204. Moreover, the prediction mode decoder 203 outputs information indicating to have been selected and the additional information in accordance with the prediction mode to the intra-frame prediction unit 211 and the motion compensated prediction unit 213, in accordance with the decoded prediction mode information.

The prediction image selection unit 204 selects a prediction image for the decoding target block, which has been outputted by any of the intra-frame prediction unit 211 and the motion compensated prediction unit 213, in accordance with the prediction mode information inputted by the prediction mode decoder 203 to output to the adder 207.

If the decoded prediction mode indicates intra-frame prediction, inputted into the intra-frame prediction unit 211 are: the intra prediction mode as the additional information in accordance with the prediction mode from the prediction mode decoder 203; and a decoded image of a region where decoding for the surroundings of the decoding target block is complete, the decoded image being stored in the intra-frame decoded image memory 208, in accordance with the intra prediction mode. Then, prediction using correlations in the frame is performed in the same intra prediction mode as that of the coding apparatus. The intra-frame prediction unit 211 outputs the intra-frame prediction image created by prediction to the prediction image selection unit 204.

With respect to the decoded difference vector value inputted by the prediction mode decoder 203, the motion vector prediction decoder 212 calculates a predicted motion vector value in the same method as the one performed in the coding apparatus, using the motion vectors of the surrounding already-decoded blocks, and outputs the value obtained by adding the difference vector value and the predicted motion vector value as the motion vector value of the decoding target block to the motion compensated prediction unit 213 and the multiple reference image composition unit 215. The motion vectors are decoded by the number of the encoded motion vectors, in accordance with the unit of a block of the prediction process, the unit being indicated by the motion compensated prediction mode or composite image motion compensated prediction mode.

The motion compensated prediction unit 213 creates a motion compensated prediction image based on the motion vector value inputted by the motion vector prediction decoder 212, the composited reference image signal inputted by the multiple reference image composition unit 215, and the information indicating whether to be the motion compensated prediction mode or composite image motion compensated prediction as the additional information in accordance with the prediction mode inputted by the prediction mode decoder 203. The created motion compensated prediction image is outputted to the prediction image selection unit 204.

The multiple reference image composition unit 215 receives the inputs of the motion vector value for one reference image indicated by the composite image motion compensated prediction mode, the motion vector value having been outputted by the motion vector prediction decoder 212, and a plurality of reference images stored in the decoded reference image memory 209, and performs the reference image composition process using the plurality of reference images. The composited reference image signal is outputted to the motion compensated prediction unit 213.

The multiple reference image composition unit 215 pairs off with the multiple reference image composite unit 107 in the video coding apparatus of the first embodiment of the present invention. The detailed operation of this block will be described later.

A description will hereinafter be given of a prediction image creation method of motion compensated prediction with the composited reference image, the method being operated in the video coding apparatus and the video decoding apparatus of the first embodiment with reference to FIGS. 3A to 3C.

Figure 3A:
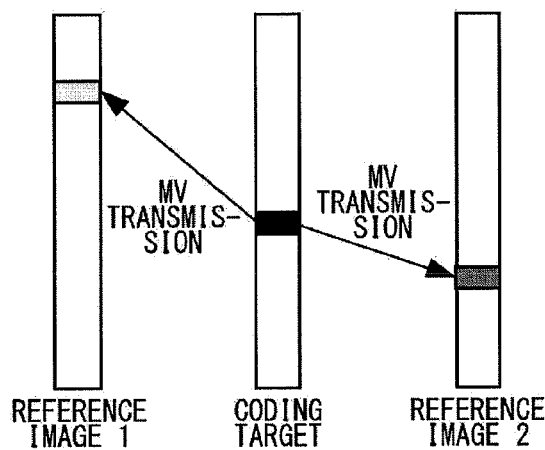
FIGS. 3A to 3C are conceptual diagrams of a composite image motion compensated prediction method in embodiments of the present invention.
Figure 3B:
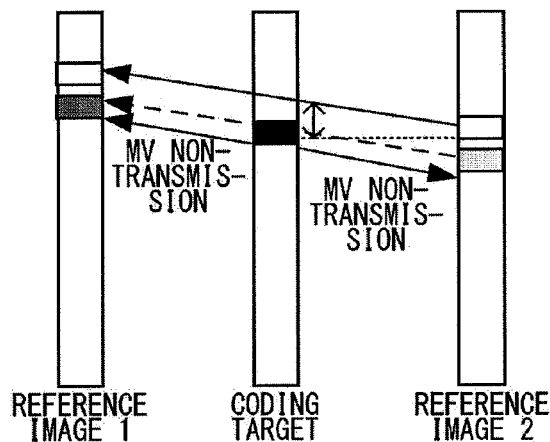
Figure 3C:
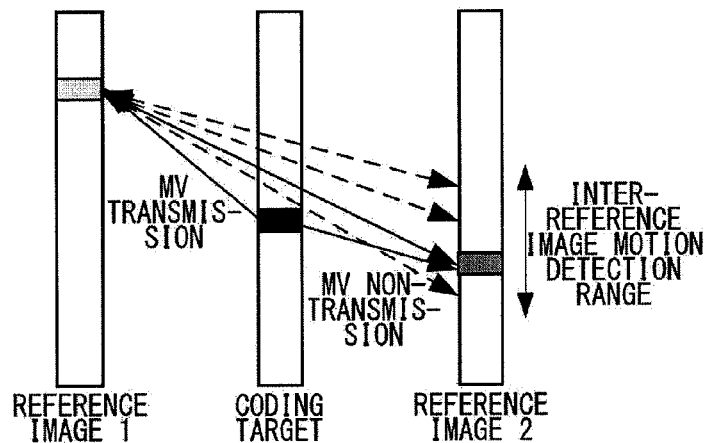

FIG. 3C is a conceptual diagram of the composite image motion compensated prediction method in embodiments of the present invention. FIGS. 3A and 3B are conceptual diagram of motion compensated prediction using a plurality of reference images, which is used in MPEG-4 AVC.

FIG. 3A depicts a method, called bi-directional prediction, for detecting motion vectors between the coding target block and each of two reference images and transmitting the motion vectors for the respective reference images, and setting an average value of the reference blocks pointed by the two motion vectors as a prediction image. The two reference images are composited; accordingly, it is possible to create a prediction image that enables the removal of a coding degradation component as a motion adaptive temporal filter and can be constructed by averaging minute changes in luminance of the coding target object.

FIG. 3B depicts a method, called a temporal direct mode, for making a prediction using two reference images without transmitting motion vectors. If a block at the same position as the coding target block in Reference Image 2 is created by motion compensated prediction from Reference Image 1, assuming that the motion is temporally continuous, it is configured that motion vector values between the coding target block and Reference Images 1 and 2 are generated to perform bi-directional prediction with the motion vectors. It is possible to create a prediction image that two reference images have been composited without transmitting motion vectors. However, as depicted in FIG. 3B, if a motion vector value between Reference Images 1 and 2 is large, motion represented by the motion vector value shows motion at a position spatially away from the coding target block, and the motion vector value is implicitly generated, limiting to the motion of when motion is temporally and spatially continuous. If there is little spatial and temporal continuity of the motion vector value, the temporal direct mode does not function effectively.

An object of the method indicated in Patent Document 1 is to improve the quality of the above temporal direct mode, and the method is for detecting motion in blocks existing at symmetrical positions centering a coding target block between reference images on both of the coding and decoding sides to create a motion vector having temporal continuity, the motion vector straddling the coding target block. The method can function effectively for a condition that is not spatially continuous, but does not function effectively similarly to the temporal direct mode if there is little temporal continuity.

As depicted in FIG. 3C, the prediction configuration of the composite motion compensated prediction of the embodiment of the present invention detects and encodes a motion vector pointing to Reference Image 1 together with performing the detection of a motion vector between reference images on Reference Image 2 for a reference block pointed by the motion vector pointing to Reference Image 1 on both of the coding and decoding sides, and transmits only the motion vector value for Reference Image 1 and creates a composite reference image using the two reference images. Accordingly, excellent bi-directional prediction is made possible for an image where continuity is not maintained spatially and temporally, and it is possible to realize the motion compensated prediction process with motion vector information less than the known bi-directional prediction.

Figure 4:
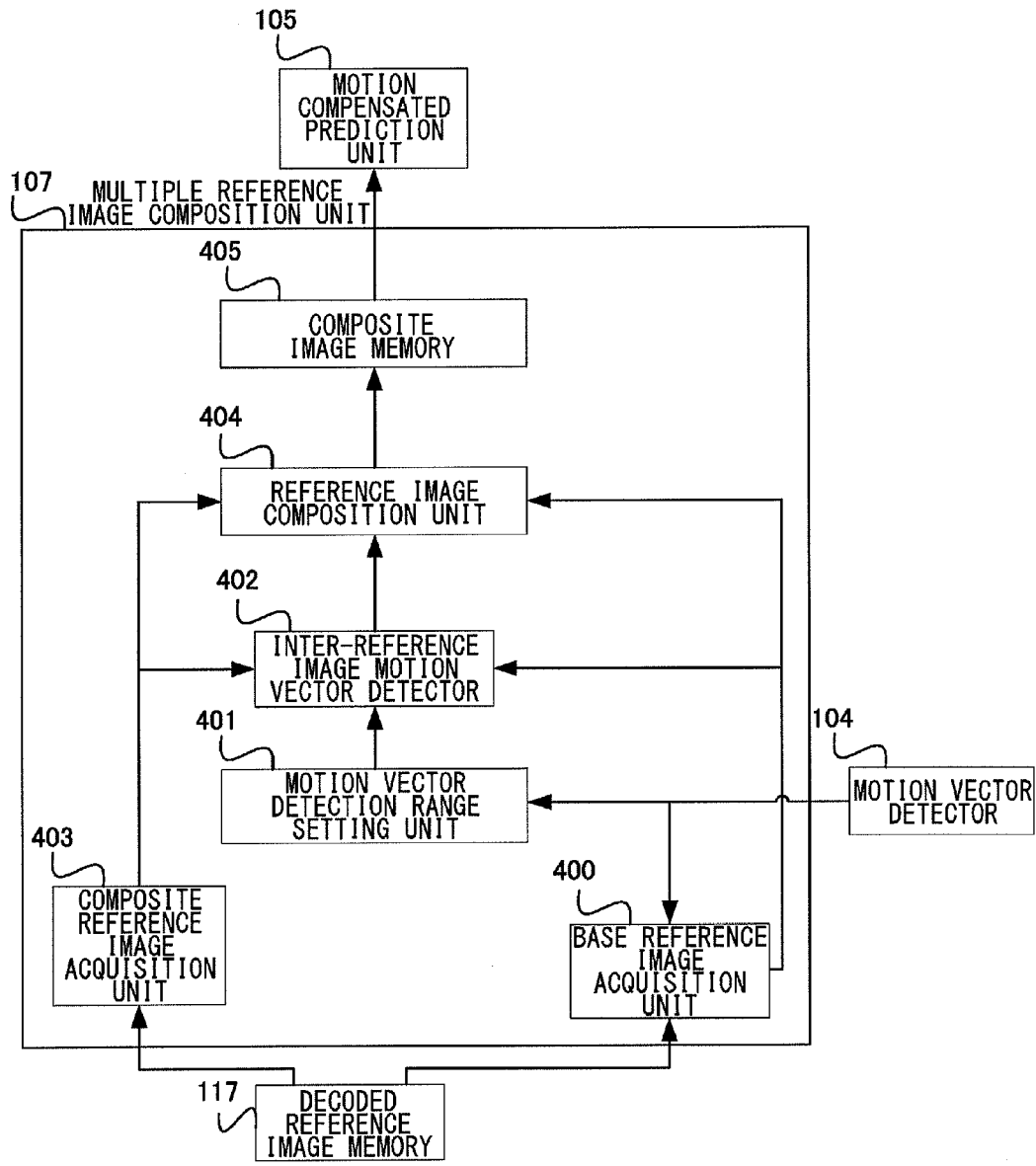
FIG. 4 is a block diagram of the configuration of a multiple reference image composition unit in the video coding apparatus of the first embodiment of the present invention.

Next, the configuration diagram of the multiple reference image composition unit in the video coding apparatus of the first embodiment is depicted in FIG. 4, and a description will be given of the operation of the process of compositing reference images. As depicted in FIG. 4, the multiple reference image composition unit 107 includes a base reference image acquisition unit 400, a motion vector detection range setting unit 401, an inter-reference image motion vector detector 402, a composite reference image acquisition unit 403, a reference image composition unit 404, and a composite image memory 405.

Firstly, the motion vector detector 104 inputs a motion vector value MV1 between a first reference image and a coding target block into the base reference image acquisition unit 400 and the motion vector detection range setting unit 401. The base reference image acquisition unit 400 acquires a reference block of the first reference image from the decoded reference image memory 117, using inputted MV1. The base reference image acquisition unit 400 outputs the acquired first reference block to the inter-reference image motion vector detector 402 and the reference image composition unit 404.

Next, the motion vector detection range setting unit 401 sets a range to detect a motion vector in between with the second reference image for the first reference block. With respect to the detection range of a motion vector between reference images, it is possible to apply a method for implicitly setting the same detection range in the coding and decoding apparatuses; however, it is also possible to use a method for transmitting, as coding information, a detection range setting that is performed frame by frame or for each reference image to be used. In the first embodiment, it is assumed that the detection range is implicitly set (e.g., ±32 pixels), and the center of the motion vector detection range is set to the same position as that of the coding target block in a reference image.

The inter-reference image motion vector detector 402 acquires a reference block of the second reference image in the motion vector detection range specified by the motion vector detection range setting unit 401, for the first reference block inputted by the base reference image acquisition unit 400, from the decoded reference image memory 117 via the composite reference image acquisition unit 403, calculates error values of block matching and the like, and calculates a motion vector having a small error value as an inter-reference image motion vector. Also with respect to the detection accuracy of an inter-reference image motion vector, it is similarly possible to apply a method for implicitly detecting a motion vector at the same detection accuracy in the coding and decoding apparatuses; however, it is also possible to use a method for transmitting, as coding information, the detection accuracy of a motion vector frame by frame or for each reference image to be used. Here, the detection accuracy is set to ¼ pixel accuracy as the implicit setting. The inter-reference image motion vector detector 402 outputs the calculated inter-reference image motion vector to the reference image composition unit 404.

The reference image composition unit 404 receives the inputs of the first reference block from the base reference image acquisition unit 400, and the inter-reference image motion vector from the inter-reference image motion vector detector 402. The reference image composition unit 404 acquires a reference block of the second reference image, which is pointed by the inter-reference image motion vector, from the decoded reference image memory 117 via the composite reference image acquisition unit 403. Accordingly, a second reference block is obtained. The reference image composition unit 404 performs the process of compositing the first and second reference blocks. The composition process in the first embodiment takes, for example, a method for averaging the first and second reference blocks on a pixel basis to create a composited reference block. The reference image composition unit 404 outputs the composited reference block to the motion compensated prediction unit 105 via the composite image memory 405.

Figure 5:
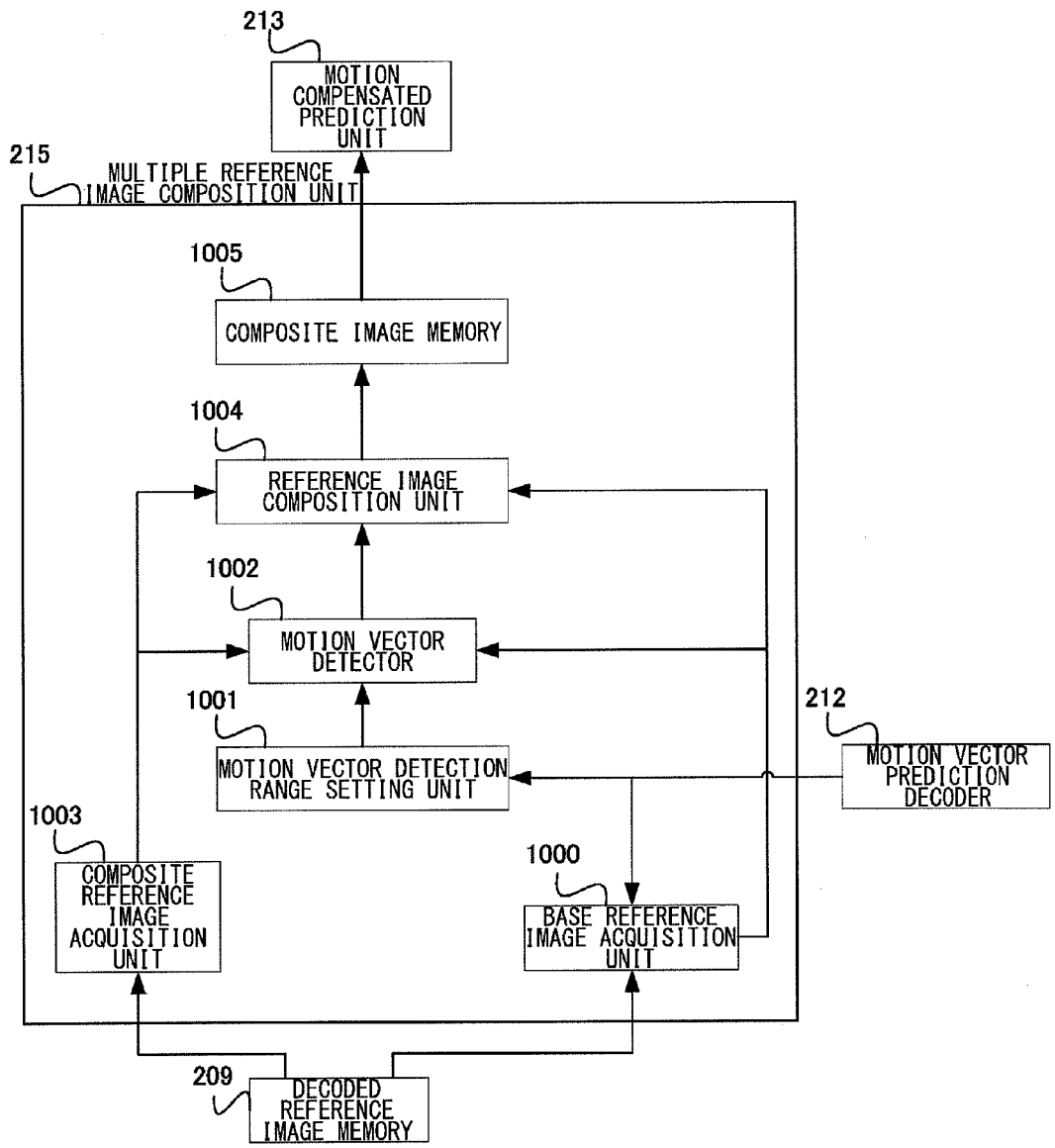
FIG. 5 is a block diagram of the configuration of a multiple reference image composition unit in the video decoding apparatus of the first embodiment of the present invention.

Next, the configuration of the multiple reference image composition unit 215 in the video decoding apparatus of the first embodiment is depicted in FIG. 5, and its operation will be described. As depicted in FIG. 5, the multiple reference image composition unit 215 includes a base reference image acquisition unit 1000, a motion vector detection range setting unit 1001, an inter-reference image motion vector detector 1002, a composite reference image acquisition unit 1003, a reference image composition unit 1004, and a composite image memory 1005. Their respective operation is performed similarly to the base reference image acquisition unit 400, the motion vector detection range setting unit 401, the inter-reference image motion vector detector 402, the composite reference image acquisition unit 403, the reference image composition unit 404, and the composite image memory 405, which are depicted in FIG. 4.

Firstly, the motion vector prediction decoder 212 inputs the decoded motion vector value MV1 into the base reference image acquisition unit 1000 and the motion vector detection range setting unit 1001. The base reference image acquisition unit 1000 acquires the reference block of the first reference image from the decoded reference image memory 209, using inputted MV1. The base reference image acquisition unit 1000 outputs the acquired first reference block to the inter-reference image motion vector detector 1002 and the reference image composition unit 1004.

Next, the motion vector detection range setting unit 1001 sets a range to detect a motion vector in between with the second reference image for the first reference block. With respect to the detection range of a motion vector, it is assumed in the first embodiment that the detection accuracy is ¼ pixel accuracy, the center of the motion vector detection range is set to the same position as that of the coding target block in a reference image, and the detection range is ±32 pixels. The motion vector detection range setting unit 1001 outputs the information of the set motion vector detection range to the inter-reference image motion vector detector 1002.

The inter-reference image motion vector detector 1002 acquires the reference block of the second reference image in the motion vector detection range specified by the motion vector detection range setting unit 1001, for the first reference block inputted by the base reference image acquisition unit 1000, from the decoded reference image memory 209 via the composite reference image acquisition unit 1003, calculates error values of block matching and the like, and calculates a motion vector having a small error value as an inter-reference image motion vector. The inter-reference image motion vector detector 1002 outputs the calculated inter-reference image motion vector to the reference image composition unit 1004.

The reference image composition unit 1004 receives the inputs of the first reference block from the base reference image acquisition unit 1000, and the inter-reference image motion vector from the inter-reference image motion vector detector 1002. The reference image composition unit 1004 acquires the reference block of the second reference image, which is pointed by the inter-reference image motion vector, from the decoded reference image memory 209 via the composite reference image acquisition unit 1003. Accordingly, the second reference block is obtained. The reference image composition unit 1004 performs the process of compositing the first and second reference blocks. The reference image composition unit 1004 outputs the composited reference block to the motion compensated prediction unit 213 via the composite image memory 1005.

The video coding apparatus and the video decoding apparatus of the first embodiment of the present invention composite a reference image on which motion compensated prediction has been performed by obtaining a motion vector between the coding target block and the first reference image, and another reference image. Accordingly, a motion compensated prediction image having few prediction residuals can be realized with additional information as little as the transmission of only one motion vector.

The use of the value of the inter-reference image motion vector and the motion vector value MV1 makes it possible to generate a motion vector value between the coding target block and the second reference image, and the value is stored in the motion vector prediction unit 106 and the motion vector prediction decoder 212 to make it possible to use the value for a predicted motion vector value for a subsequent coding target block. Accordingly, the motion vector value that the decoding apparatus can recognize increases and the prediction accuracy of a motion vector improves. Therefore, there is a new effect that a motion vector can be transmitted with less information.

Second Embodiment

Figure 6:
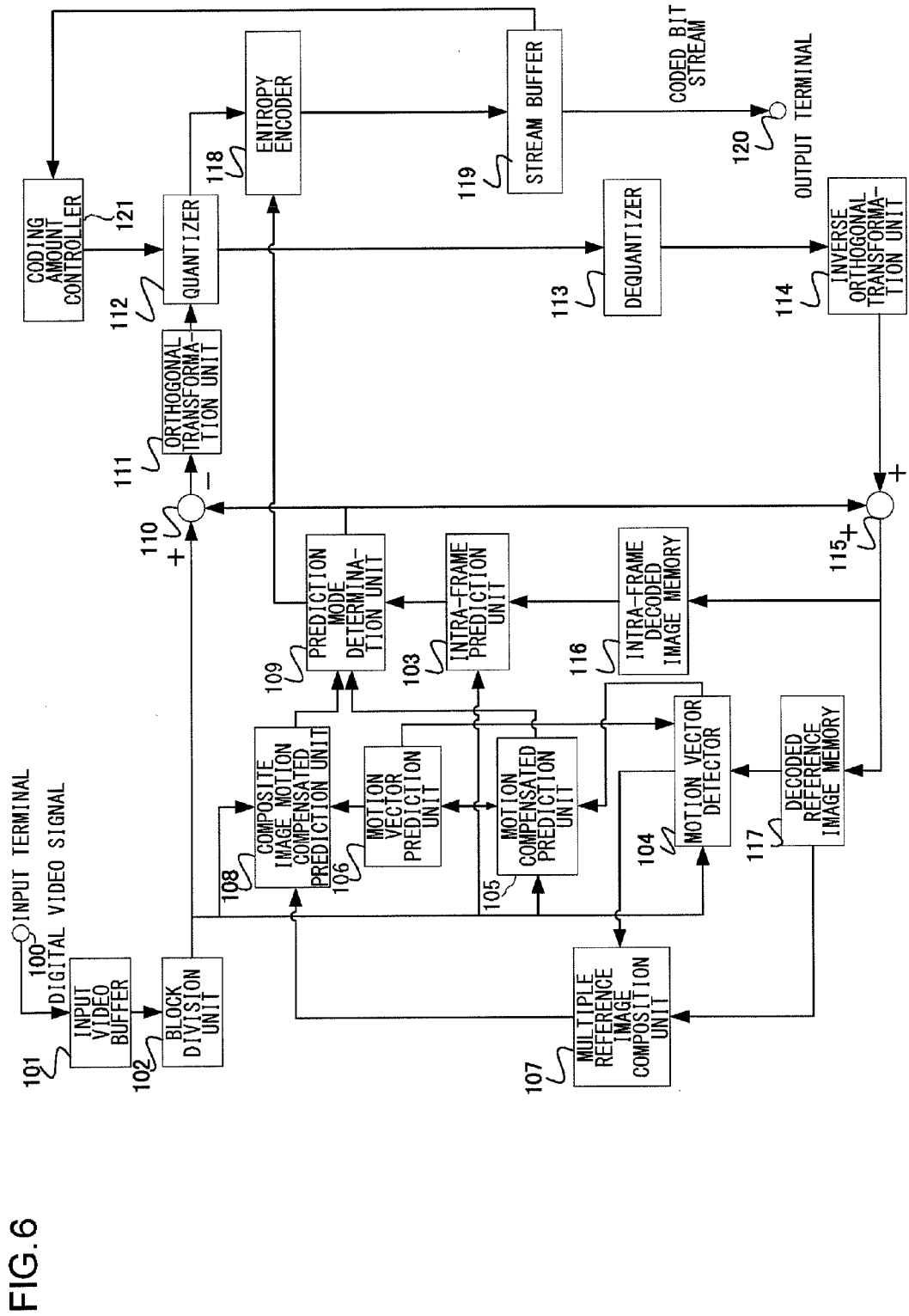
FIG. 6 is a block diagram of the configuration of a video coding apparatus of a second embodiment of the present invention.

Next, a description will be given of a second embodiment. The second embodiment takes a configuration where the accuracy of a motion vector to be used for the process of compositing reference images is decreased and a phase adjustment is made for a composited reference image at high accuracy. FIG. 6 is a block diagram of the configuration of a video coding apparatus of the second embodiment.

As depicted in FIG. 6, the video coding apparatus of the second embodiment includes an input terminal 100, an input video buffer 101, a block division unit 102, an intra-frame prediction unit 103, a motion vector detector 104, a motion compensated prediction unit 105, a motion vector prediction unit 106, a multiple reference image composition unit 107, a composite image motion compensated prediction unit 108, a prediction mode determination unit 109, a subtractor 110, an orthogonal transformation unit 111, a quantizer 112, a dequantizer 113, an inverse orthogonal transformation unit 114, an adder 115, an intra-frame decoded image memory 116, a decoded reference image memory 117, an entropy encoder 118, a stream buffer 119, an output terminal 120, and a coding amount controller 121. It is configured that the function of the composite image motion compensated prediction unit 108 is added to and the operation of the multiple reference image composition unit 107 is different from the first embodiment. Only the operation of the function blocks related to the added composite image motion compensated prediction unit 108 will be described.

The motion compensated prediction unit 105 receives the input of the motion vector value obtained by the motion vector detector 104, creates motion compensated prediction images for a plurality of block sizes equal to 16×16 or smaller and a plurality of reference images as in the first embodiment, selects a prediction signal having the least difference information to be encoded for the coding target block inputted by the block division unit 102, and outputs the selected motion compensated prediction mode and prediction signal to the prediction mode determination unit 109.

The motion vector prediction unit 106 uses the motion vectors of the surrounding already-coded blocks to calculates a predicted motion vector value in a similar method to that of the first embodiment, and supplies the value to the motion vector detector 104, the motion compensated prediction unit 105 and the composite image motion compensated prediction unit 108.

The multiple reference image composition unit 107 receives the inputs of a motion vector value for one reference image outputted from the motion vector detector 104, and a plurality of reference images stored in the decoded reference image memory 117, and performs the reference image composition process using the plurality of reference images. The composited reference image signal is outputted to the composite image motion compensated prediction unit 108.

The composite image motion compensated prediction unit 108 uses the composited reference image signal inputted by the multiple reference image composition unit 107, and the predicted motion vector value inputted by the motion vector prediction unit 106, selects a prediction signal having the least difference information to be encoded, for the coding target block inputted by the block division unit 102, and outputs the selected composite image motion compensated prediction mode and prediction signal to the prediction mode determination unit 109. The detailed operation of the multiple reference image composition unit 107 and the composite image motion compensated prediction unit 108 will be described later.

Figure 7:
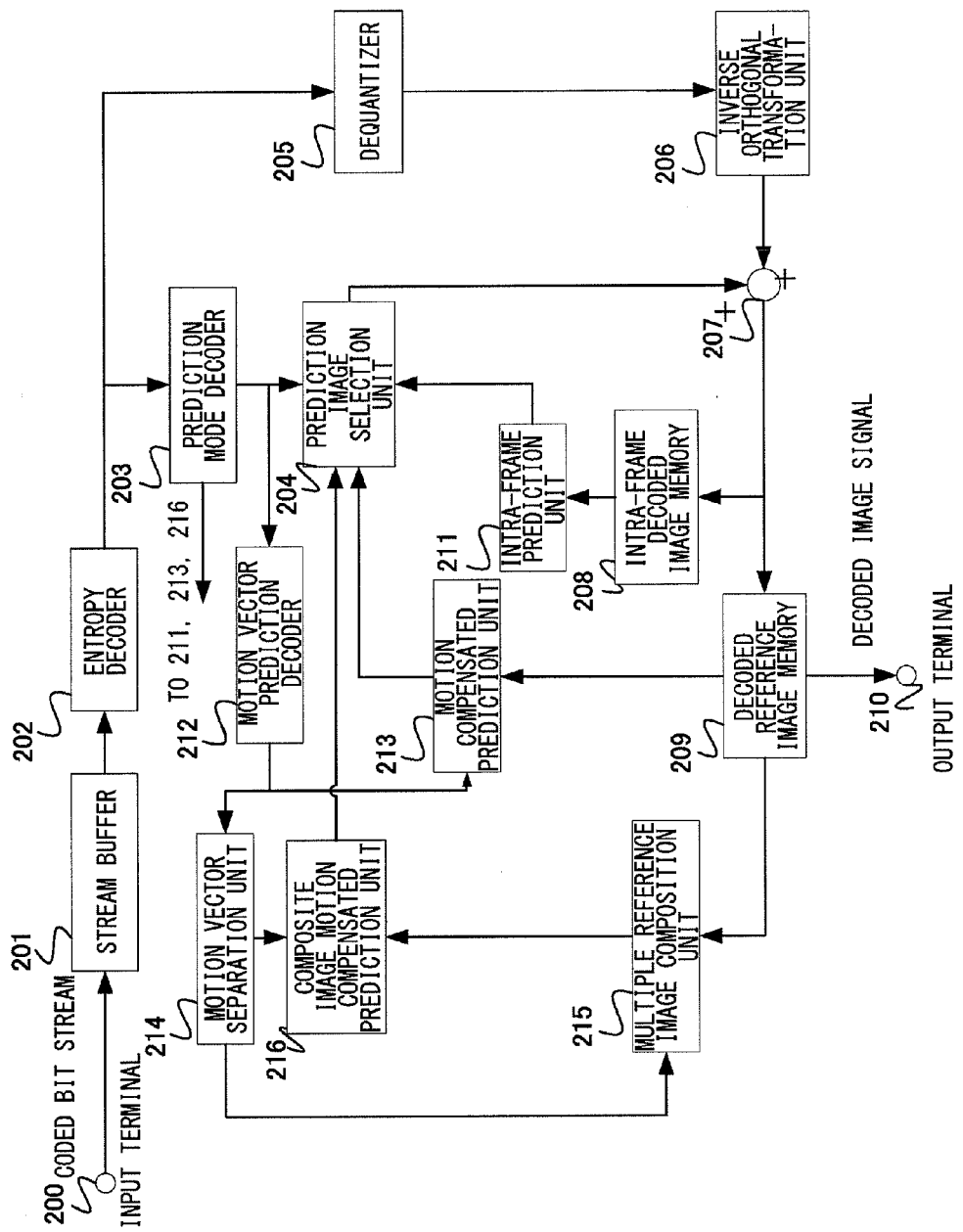
FIG. 7 is a block diagram of the configuration of a video decoding apparatus of the second embodiment of the present invention.

Next, a description will be given of a video decoding apparatus that decodes the coded bit stream generated by the video coding apparatus of the second embodiment. FIG. 7 is a configuration diagram of the video decoding apparatus of the second embodiment.

As depicted in FIG. 7, the video decoding apparatus of the second embodiment includes an input terminal 200, a stream buffer 201, an entropy decoder 202, a prediction mode decoder 203, a prediction image selection unit 204, a dequantizer 205, an inverse orthogonal transformation unit 206, an adder 207, an intra-frame decoded image memory 208, a decoded reference image memory 209, an output terminal 210, an intra-frame prediction unit 211, a motion vector prediction decoder 212, a motion compensated prediction unit 213, a motion vector separation unit 214, a multiple reference image composition unit 215, and a composite image motion compensated prediction unit 216. It is configured that the functions of the motion vector separation unit 214 and the composite image motion compensated prediction unit 216 are added to and the operation of the multiple reference image composition unit 215 is different from the first embodiment. Only the operation of the function blocks related to the added motion vector separation unit 214 and composite image motion compensated prediction unit 216 will be described.

The prediction mode decoder 203 performs processes similar to those of the first embodiment, but is different, as operation, in that information indicating to have been selected and additional information in accordance with a prediction mode are outputted to the intra-frame prediction unit 211, the motion compensated prediction unit 213, and the composite motion compensated prediction unit 216 in accordance with the decoded prediction mode information.

In accordance with the prediction mode information inputted by the prediction mode decoder 203, the prediction image selection unit 204 receives the input of a decoding target block outputted by any of the composite motion compensated prediction unit 216 in addition to the intra-frame prediction unit 211 and the motion compensated prediction unit 213, performs the process of selecting a prediction image, and outputs the selected decoding target block to the adder 207.

The motion vector prediction decoder 212 calculates the motion vector value of the decoding target block in a method similar to that of the first embodiment, and outputs the motion vector value to the motion compensated prediction unit 213 and the composite image motion compensated prediction unit 216. The motion vectors are decoded by the number of the encoded motion vectors, in accordance with the unit of a block of the prediction process, the unit being indicated by the motion compensated prediction mode or composite image motion compensated prediction mode.

The motion compensated prediction unit 213 creates a motion compensated prediction image from the motion vector value inputted by the motion vector prediction decoder 212 and the motion compensated prediction mode as additional information in accordance with the prediction mode inputted by the prediction mode decoder 203, and outputs the created motion compensated prediction image to the prediction image selection unit 204.

The motion vector separation unit 214 separates the motion vector values inputted by the motion vector prediction decoder 212 into motion vector values converted to predetermine pixel accuracy (hereinafter described as base motion vector values), and difference vector values between the motion vector values and the base motion vector values (hereinafter described as correction vector values), and outputs the base motion vector values to the multiple reference image composition unit 215 and the correction vector values to the composite image motion compensated prediction unit 216. The motion vector values and correction vector values are decoded by the number of the encoded ones, in accordance with the unit of a block of the prediction process, the unit being indicated by the composite image motion compensated prediction mode.

The multiple reference image composition unit 215 receives the inputs of the base motion vector value for one reference image indicated by the composite image motion compensated prediction mode, the base motion vector value having been outputted from the motion vector separation unit 214, and a plurality of reference images stored in the decoded reference image memory 209, and performs the reference image composition process using the plurality of reference images. The composited reference image signal is outputted to the composite image motion compensated prediction unit 216.

The composite image motion compensated prediction unit 216 uses the composited reference image signal inputted by the multiple reference image composition unit 215 and a correction vector value for one reference image indicated by the composite image motion compensated prediction mode, the correction vector value having been outputted by the motion vector separation unit 214, to cut a prediction block for the decoding target block from the composited reference image signal. The composite image motion compensated prediction unit 216 outputs to the prediction image selection unit 204 a composite motion compensated prediction image created by superimposing the cut prediction block on all the blocks indicated by the composite image motion compensated prediction mode.

The multiple reference image composition unit 215 and the composite image motion compensated prediction unit 216 pair off with the multiple reference image composition unit 107 and the composite image motion compensated prediction unit 108 in the video coding apparatus of the second embodiment of the present invention, and the detailed operation of these blocks and the motion vector separation unit 214 will be described later.

A description will hereinafter be given of the mechanism as a whole of a prediction image creation method of composite image motion compensated prediction, the mechanism being operated in the video coding apparatus and the video decoding apparatus of the second embodiment with reference to FIG. 8, and the detailed operation will subsequently be described.

Figure 8:
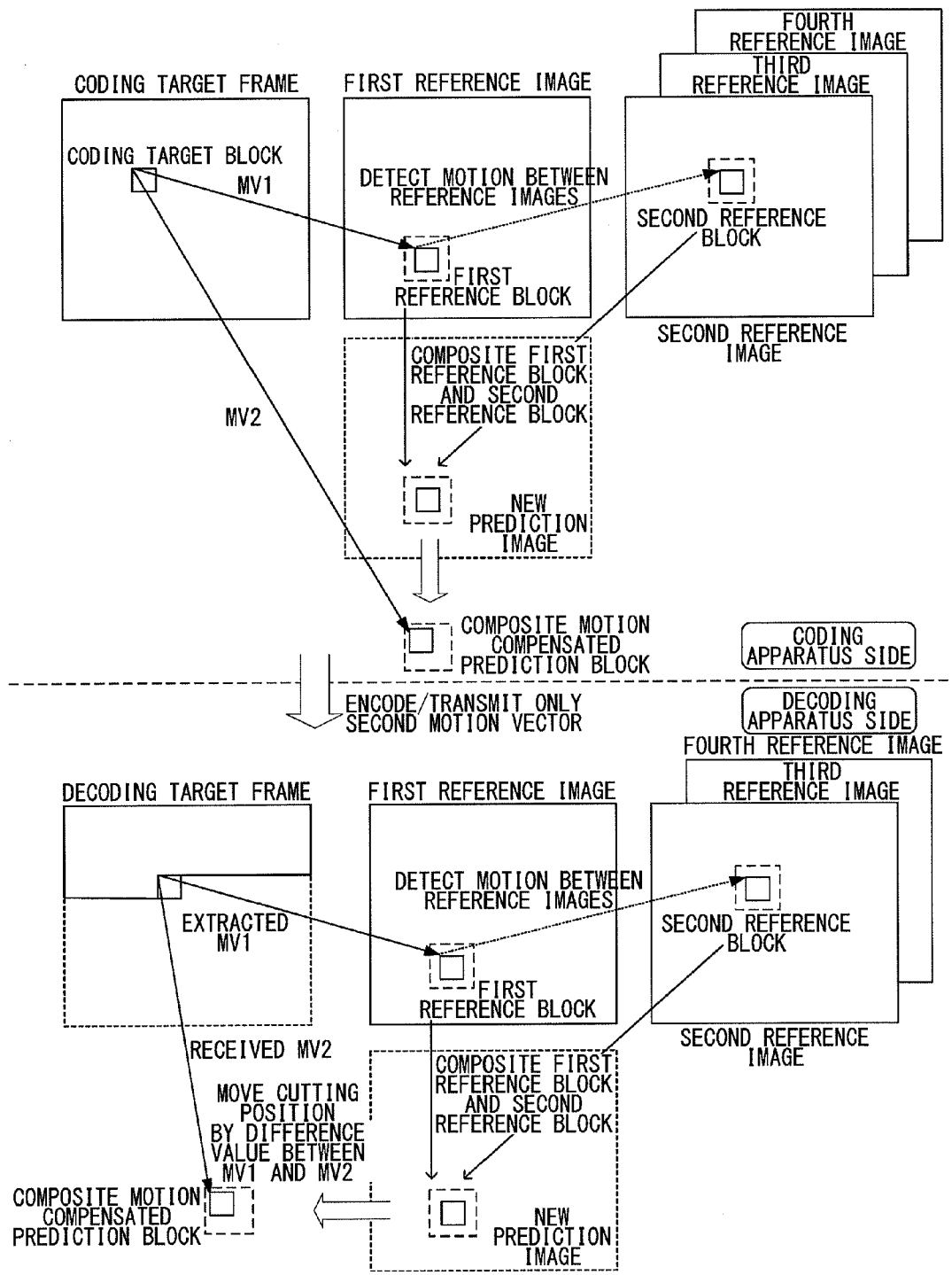
FIG. 8 is a conceptual diagram of the operation of a composite image motion compensated prediction process in the second embodiment of the present invention.

FIG. 8 is a conceptual diagram of the operation of the composite image motion compensated prediction process in the second embodiment of the present invention. On the coding apparatus side, firstly, a reference image being a base is set to as a first reference image, and a motion vector between the coding target frame and the first reference image is detected to generate a first motion vector value MV1. In the configuration of FIG. 6, MV1 is obtained by the motion vector detector 104. Here, the accuracy of MV1 is assumed to be N pixels (e.g., 1 pixel). If the motion vector value detected by the motion vector detector 104 has higher accuracy than N pixel accuracy, the detected motion vector value is rounded to N pixel accuracy to generate MV1.

Next, assuming a reference block that has been cut by MV1 from the first reference image is a first reference block, an inter-reference image motion vector between the first reference block and a second reference image is detected. Based on the detected motion, a prediction image at M pixel (e.g., ¼ pixel) accuracy where M<N is created by means such as filtering for the first reference block and its surroundings. A prediction image at similar accuracy is created for a second reference block, which has been cut from the second reference image using the inter-reference image motion vector, and its surroundings. These are used to create a composited prediction image including the surroundings.

A motion vector at M pixel accuracy between the last created prediction image including the surroundings and the coding target block is detected by means such as block matching. A second motion vector value MV2 detected as a result is encoded and transmitted as a motion vector between the coding target block and the first reference image, and the composited prediction image specified by MV2 is subtracted, as a composite motion compensated prediction block, from the coding target block. The difference block is encoded and transmitted.

On the other hand, on the decoding apparatus side, the second motion vector value MV2, which is received first, is rounded to N pixel accuracy to reconstruct the first motion vector value MV1. Next, assuming a reference block that has been cut by MV1 from the first reference image is a first reference block, an inter-reference image motion vector between the first reference block and the second reference image is detected. Based on the detected motion, a prediction image at M pixel accuracy is created by means such as filtering specified on the coding side for the first reference block and its surroundings. A prediction image at similar accuracy is created for a second reference block, which has been cut from the second reference image using the inter-reference image motion vector, and its surroundings. These are used to create a composited prediction image including the surroundings.

The composited prediction image at a position specified by the second motion vector value MV2 is cut from the last created prediction image including the surroundings to create the same composite motion compensated prediction block as the one created on the coding apparatus side.

In this mechanism, image composition with motion compensation in between with another reference image is performed using a template where the first reference block is set as a block having information close to the coding target block. Accordingly, it is possible to obtain a similar effect to that of the first embodiment that it is possible to generate a prediction signal having a characteristic close to prediction using two reference images (bi-directional prediction) in motion compensated prediction such as MPEG-4 AVC. At the same time, it is not necessary to determine a motion vector value by the composition process for each high accuracy at a ¼ accuracy level, on the coding apparatus side, and it is possible to correct a motion vector value at high accuracy (M pixel accuracy) with a motion vector value at low accuracy at a 1-pixel accuracy level as a reference, for a composited reference image. Accordingly, it is possible to obtain a motion vector value with few processes, taking into account the correction of a phase that has shifted minutely in the composition process, and the result of the removal of a noise component of the reference image in the composition process, and it is possible to create a prediction image block with high accuracy.

Moreover, in the decoding apparatus, it becomes possible to use an image that can be created by directly acquiring pixels of a reference image at a 1-pixel accuracy level, for the detection of a motion vector between reference images in the composition process, and there is also an effect that it becomes possible to operate a filtering process at fractional pixel accuracy and a motion vector detection process in parallel.

Figure 9:
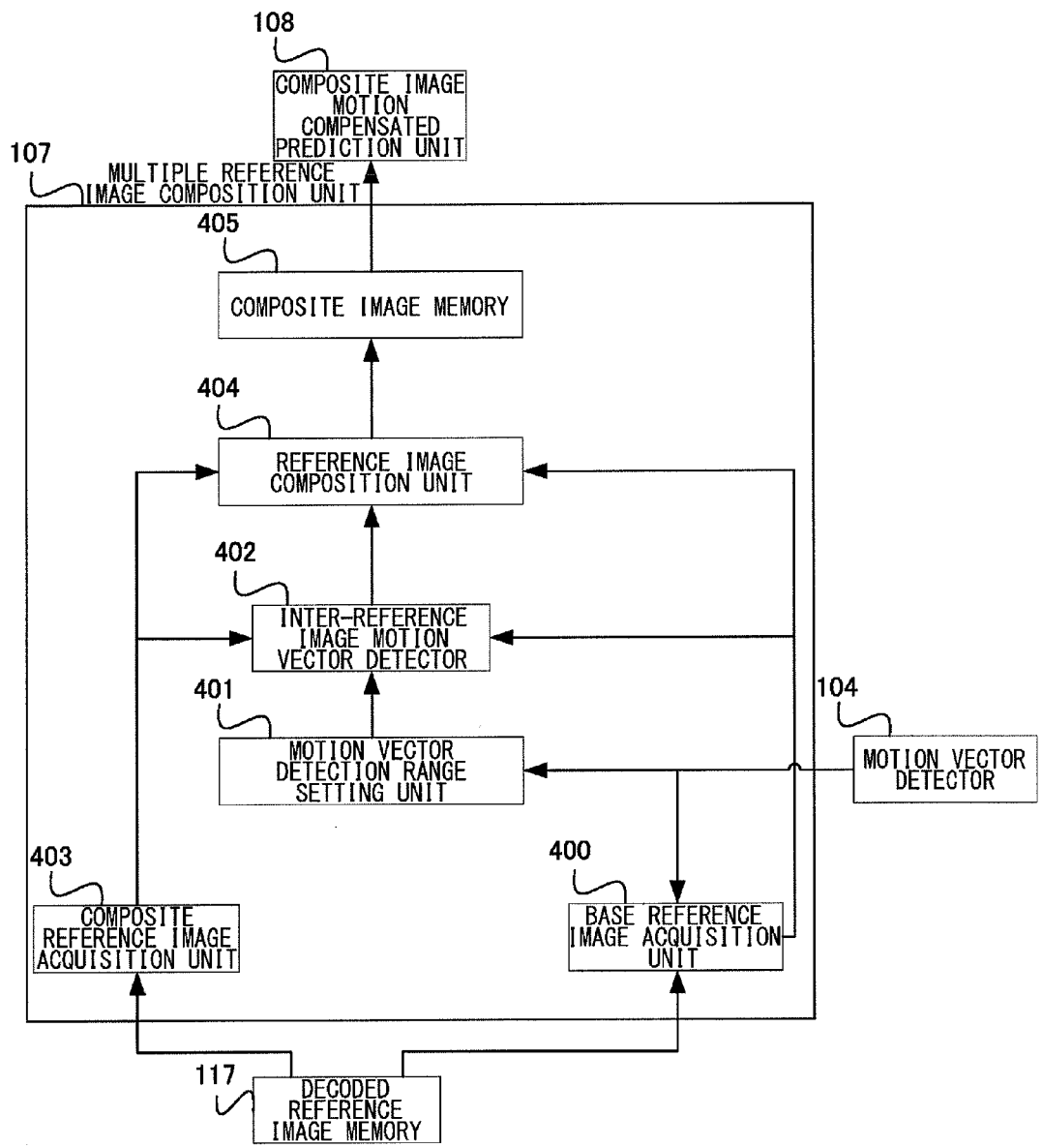
FIG. 9 is a block diagram of the configuration of a multiple reference image composition unit in the video coding apparatus of the second embodiment of the present invention.
Figure 10:
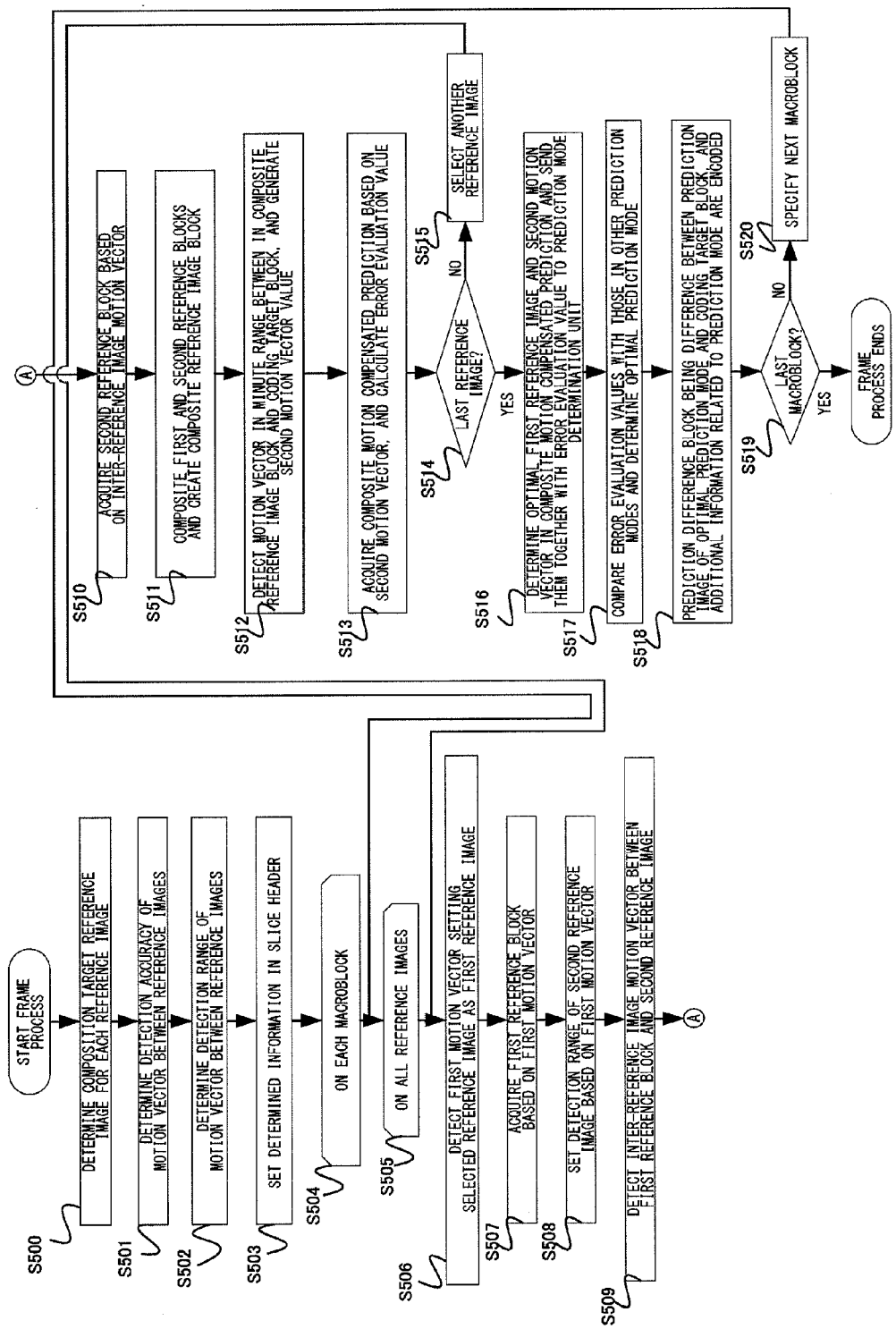
FIG. 10 is a flowchart for explaining the operation of the multiple reference image composition unit and a composite image motion compensated prediction unit in the video coding apparatus in the second embodiment of the present invention.

Next, the configuration of the multiple reference image composition unit 107 in the coding apparatus, which realizes the mechanism depicted in FIG. 8, is depicted in FIG. 9, and the flowchart of the composite image motion compensated prediction process that operates in the multiple reference image composition unit 107 and the composite image motion compensated prediction unit 108 is depicted in FIG. 10. The detailed operation will be described.

As depicted in FIG. 9, the multiple reference image composition unit 107 includes a base reference image acquisition unit 400, a motion vector detection range setting unit 401, an inter-reference image motion vector detector 402, a composite reference image acquisition unit 403, a reference image composition unit 404, and a composite image memory 405.

Firstly, the motion vector detector 104 inputs the motion vector value MV1 between the first reference image and the coding target block into the base reference image acquisition unit 400 and the motion vector detection range setting unit 401. The base reference image acquisition unit 400 acquires the reference block of the first reference image from the decoded reference image memory 117, using inputted MV1. A region to acquire the reference block takes up a region necessary to create a reference image at M pixel accuracy (M<N), the region being equal to a target block ±N/2 pixel or more, relative to the position in the first reference image, the position having moved by the value of MV1 from the coding target block. For example, if N is 1 pixel, M is ¼ pixel, and a 6-tap filter used in MPEG-4 AVC is used for a magnification filter necessary to create an image at ¼ pixel accuracy, a reference image of a region of ±3 pixels in addition to a coding target block size is acquired as the first reference block. The base reference image acquisition unit 400 outputs the acquired first reference block to the inter-reference image motion vector detector 402 and the reference image composition unit 404.

Next, the motion vector detection range setting unit 401 sets a range to detect a motion vector in between with the second reference image for the first reference block. With respect to the detection range of a motion vector between reference images, it is possible to apply a method for implicitly setting the same detection range in the coding and decoding apparatuses. However, it is also possible to use a method for transmitting, as coding information, a detection range setting that is performed frame by frame or for each reference image to be used. A detection range setting algorithm in the second embodiment will be described later with reference to FIG. 10. The motion vector detection range setting unit 401 outputs the information of the set motion vector detection range to the inter-reference image motion vector detector 402.

The inter-reference image motion vector detector 402 acquires the reference block of the second reference image in the motion vector detection range specified by the motion vector detection range setting unit 401, for the first reference block inputted by the base reference image acquisition unit 400, from the decoded reference image memory 117 via the composite reference image acquisition unit 403, calculates error values of block matching and the like, and calculates a motion vector having a small error value as an inter-reference image motion vector. Also with respect to the detection accuracy of an inter-reference image motion vector, it is similarly possible to apply a method for implicitly detecting a motion vector at the same detection accuracy in the coding and decoding apparatuses; however, it is also possible to use a method for transmitting, as coding information, the detection accuracy of a motion vector frame by frame or for each reference image to be used. The inter-reference image motion vector detector 402 outputs the calculated inter-reference image motion vector to the reference image composition unit 404.

The reference image composition unit 404 receives the inputs of the first reference block from the base reference image acquisition unit 400, and the inter-reference image motion vector from the inter-reference image motion vector detector 402. The reference image composition unit 404 acquires the reference block of the second reference image, which is pointed by the inter-reference image motion vector, from the decoded reference image memory 117 via the composite reference image acquisition unit 403. Accordingly, the second reference block is obtained. The reference image composition unit 404 performs the process of compositing the first and second reference blocks. The composition process in the second embodiment takes, for example, a method for averaging the first and second reference blocks on a pixel basis to create a composited reference block. The reference image composition unit 404 outputs the composited reference block to the composite image motion compensated prediction unit 108 via the composite image memory 405.

Next, a description will be given of the operation of the composite image motion compensated prediction process using these configurations with reference to the flowchart of FIG. 10. FIG. 10 depicts the flow of the operation of the composite image motion compensated prediction in the process of encoding one frame. With respect to the operation of the other processing units, it is possible to use a known video encoding process such as MPEG-4 AVC.

Figure 11:
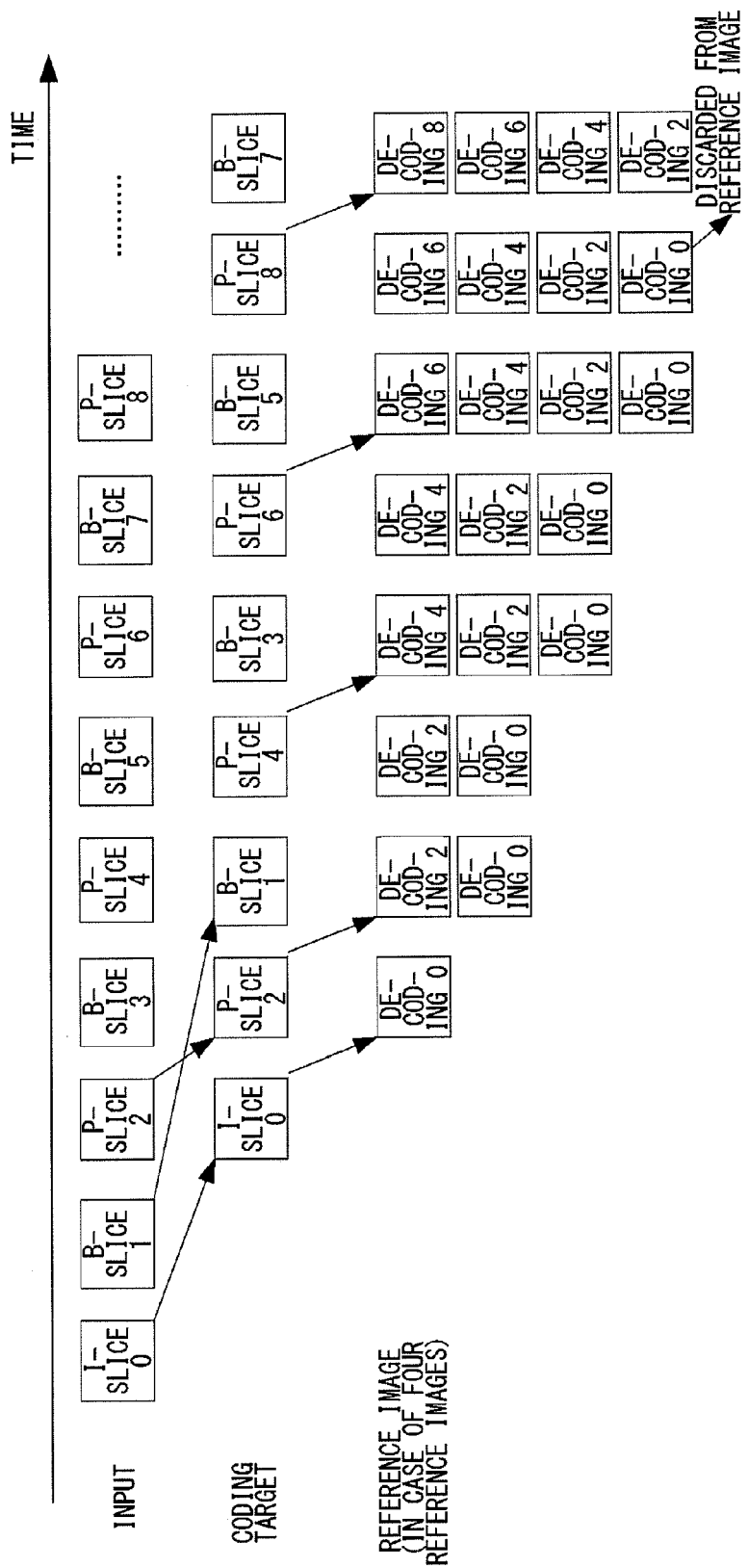
FIG. 11 is a view of an example of the processing order of an encoding process and reference image management in the second embodiment of the present invention.

At the time of starting processing one frame, firstly, a composition target reference image for each reference image is determined (S500). A reference image for motion compensated prediction in the second embodiment can be selected from a plurality of reference images to be used. FIG. 11 depicts an example of the processing order of the encoding process and reference image management in the second embodiment, and a description thereof will be given.

A process of performing coding that does not use motion compensated prediction, called I-slice, is performed on the first frame or intermittently. A decoded image encoded with an I-slice is accumulated in the decoded reference image memory 117 to be a reference image of a frame to be subsequently encoded.

A P-slice uses the decoded image of a temporally preceding frame as a reference image and is a frame that enables compression with a temporal correlation using motion compensated prediction. In the example of the encoding process order of the second embodiment in FIG. 11, all decoded images of P-slices are used as reference images. The added reference images are accumulated in the decoded reference image memory 117 and are stored up to the predefined number of reference images.

A B-slice is a frame on which motion compensated prediction can be performed by adding two reference images. Motion compensated prediction at high prediction accuracy becomes possible by using temporally preceding and following reference images; however, if two reference images are used, it is necessary to encode two motion vectors. In the example of the encoding process order of the second embodiment in FIG. 11, decoded images of B-slices are not used as reference images.

As in the example depicted in FIG. 11, if a B-slice is an encoding process set for each frame, and can store four reference images, a new reference image is stored after the coding of I- and P-frames, and if the reference images totals four or more, one reference image is discarded. Accordingly, a new decoded image is used as a reference image. In the example of the reference image management of the second embodiment in FIG. 11, the temporally oldest frame is selected as a reference image to be discarded.

In this manner, it is possible to selectively use a reference image from every plurality of reference images for a coding target frame; accordingly, firstly, the process of determining a reference image targeted for composition is performed for each reference image. Implicit stipulations are established to make a similar judgment in the coding apparatus and the decoding apparatus. Hence, an appropriate composition process becomes possible.

For example, in the case where a coding target frame is a B-slice, a reference image closest to the coding target frame, which is in a temporal relationship straddling the coding target frame, with a first reference image being a base reference image, is set as a second reference image being a reference image used for composition. In the case where a coding target is a P-slice, if the first reference image is a reference image closest to the coding target frame, a reference image second closest to the coding target frame is set as the second reference image, and if other than this, a reference image closest to the coding target frame is set as the second reference frame.

If the reference images to be composition targets are determined for all reference images, then the detection accuracy of a motion vector between reference images is determined (S501). Here, the motion vector detection accuracy is set to ¼ pixel being the detection accuracy for transmission in the final composite motion compensated prediction. However, it is also possible to perform the composition process at high accuracy without increasing the accuracy of a motion vector to be transmitted by obtaining motion at higher accuracy such as ⅛ pixel accuracy.

Next, a range to detect a motion vector between reference images is determined (S502). With respect to the detection range, it is also possible to use the entire regions of second reference images as the motion vector detection range for all first reference blocks. The coding apparatus of the second embodiment functions by performing the detection process with the same definition as that of the decoding apparatus; however, the setting of a detection range, which is depicted in FIG. 12, is performed to reduce the amount of computation in the detection of a motion vector between reference images.

Figure 12:
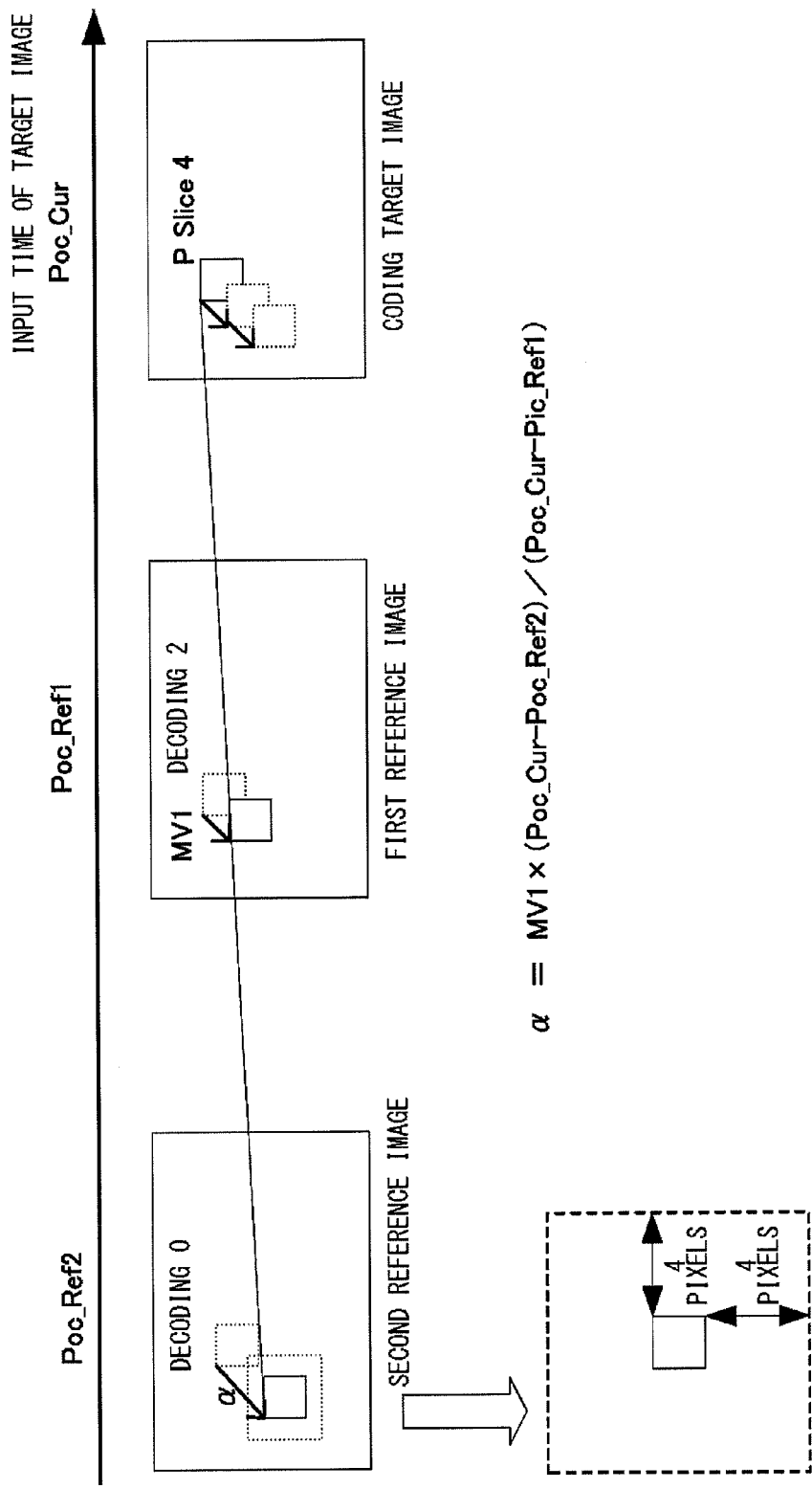
FIG. 12 is a view of an example of the detection range of a motion vector between reference images in the second embodiment of the present invention.

FIG. 12 is an example of the detection range of a motion vector between reference images in the second embodiment. It is assumed that the input time of a coding target image is Poc_Cur, the input time of a first reference image is Poc_Ref1, and the input time of a second reference image is Poc_Ref2. If, in relation to the motion vector MV1 from the first reference image for the coding target block, the search range of the second reference image is set relative to the position of the coding target block, as expressed by $$\alpha = MV1 \times (Poc\_Cur - Poc\_Ref2)/(Poc\_Cur - Poc\_Ref1),$$

a search center position is set to a motion vector prediction value between the coding target block and the second reference image of when assuming that motion is temporally continuous.

However, there are many cases where changes are not temporally continuous, such as the motion of a camera and an object. Accordingly, a specific region is searched for a motion vector, centering a search position to enable the acquisition of the reference block of the second reference image, which is appropriate for the composition process. In the example depicted in FIG. 12, a region of ±4 pixels is specified as the specific region.

Specifically, in S502, only the process of determining the above definition of ±4 pixels is performed, and the calculation of a search center position for acquiring a composite reference image for each coding target block is made for each target block.

Next, the information to cause the decoding apparatus to function similar processes by being transmitted as an coded bit stream within the process definition in units of frames is transmitted in a slice header to transmit information in units of frames. FIG. 13 depicts an example of additional information to a slice header in the second embodiment.

The slice header in FIG. 13 is based on a slice header in MPEG-4 AVC; accordingly, the parts described are related to only the information added. The composite motion compensated prediction is not used for I-slices being the inter frame prediction mode Accordingly, the information added is transmitted if other than I-slices.

Firstly, information to control whether to perform slice-based composite motion compensated prediction, refinement_mc_enable, is transmitted in one bit. Furthermore, if refinement_mc_enable is 1 (the composite motion compensated prediction is performed), the following three pieces of information are transmitted.

One of them is information indicating whether to adaptively switch from a known motion compensated prediction or replace the known motion compensated prediction with the composite motion compensated prediction, and is transmitted in one bit as refinement_mc_adaptive.

The second is the two-bit data of information indicating the detection range of a motion vector between reference images to be transmitted as refinement_mc_matching_range_full. As an example, the two-bit data is set to indicate that the following detection ranges have been defined.

| | |
|---|---|
| 00 | ±1 pixel |
| 01 | ±2 pixels |
| 10 | ±4 pixels |
| 11 | ±8 pixels |

The third is the two-bit data of information indicating the detection range of a motion vector between reference images to be transmitted as refinement_mc_matching_subpel. As an example, the two-bit data is set to indicate that the following detection accuracy has been defined.

| | |
|---|---|
| 00 | 1 pixel accuracy (detection at fractional accuracy is not performed) |
| 01 | ½ pixel accuracy |
| 10 | ¼ pixel accuracy |
| 11 | ⅛ pixel accuracy |

In this manner, after the frame-based setting is determined, the composite motion compensated prediction process is performed on a macroblock being a coding target block in the coding target frame. Setting a reference image selected first as a first reference image, the detection of a first motion vector is performed on each macroblock (S504) and all reference images (S505) (S506).

The above detection process can be operated by the motion vector detector 104 used for the known motion compensated prediction. However, if the known motion compensated prediction is not used, it is also possible to add a similar motion vector detection process to the composite motion compensated prediction or always set a predicted motion vector value outputted from the motion vector prediction unit 106 as the first motion vector value.

If a predicted motion vector value is used as the first motion vector value, a difference motion vector value is an offset from the center position as the result of searching a minute range after reference images are composited, and there is an advantage that the amount of the difference motion vector information to be transmitted decreases.

The first motion vector is set to 1 pixel accuracy, and if a motion vector value inputted by the motion vector detector 104 or the motion vector prediction unit 106 is a motion vector at less than one pixel accuracy, the operation of rounding the motion vector value to 1 pixel accuracy is performed. For example, if an inputted motion vector value MV1org is at ¼ pixel accuracy, the first motion vector value MV1 is obtained by the following calculation:

$$MV1 = (MV1org + 2) >> 2$$

Next, the first reference block is acquired based on the first motion vector (S507). As described in the explanation of FIG. 9, acquired as the first reference block is a reference image of a region of ±3 pixels in addition to the coding target block size, as a region necessary to create a reference image at ¼ pixel accuracy, the region being equal to a target block±½ pixel or more, relative to the position in the first reference image, the position having moved by the value of MV1 from the coding target block.

Next, the detection range of the second reference image is set based on the first motion vector (S508). The selection of a reference image to be used for the second reference image is determined by the definition decided in S500. With respect to the detection range, the detection range depicted in FIG. 12, which was described in S502, is set. The detection of an inter-reference image motion vector between the first reference block and the second reference image is performed on the set detection range (S509).

Next, the second reference block is acquired using the detected inter-reference image motion vector (S510). The second reference block acquires a reference image of a region of the coding block size±3 pixels similar to the first reference block, relative to the position in the second reference image, the position having moved by the motion vector value between reference images from the first reference block.

Next, the first and second reference blocks are composited to create a composite reference image block (S511). As an algorithm for composition, the average value of the first and second reference blocks is calculated on a pixel basis to create a composite reference image block. In the composite reference image block, it is also possible to deal with weighted prediction (Weighted Prediction) used in MPEG-4 AVC. It is still also possible to assign weights to the composite reference image block and take a weighted average by making the addition ratio of the first reference block to the second reference block inversely proportional to a distance from the coding target image. If they are switched, information for specifying the addition method is transmitted in units of frames or macroblocks.

Next, the detection of a motion vector between in the composite reference image block and the coding target block is performed on a minute range to generate a second motion vector value (S512). Specifically, if the first motion vector value is at 1 pixel accuracy and a motion vector at ¼ pixel accuracy is detected, a block of the same size as the coding target block is cut from the same position in the composite reference image block while moving horizontally or vertically in units of ¼ pixel within a range of ±½ pixel, relative to the position pointed by the first motion vector MV1, and block matching with the coding target block is performed for the first reference block.

As a result of block matching, the smallest error evaluation value in between with the coding target block is calculated as the second motion vector value MV2. Assuming that the amount of movement indicating the moving range is MVdelta, it is outputted as:

$$MV2=(MV1<<2)+MV\text{delta}.$$

Here, MVdelta is calculated by −2≤MVdelta<2 at ¼ pixel accuracy for both horizontal and vertical directions. Accordingly, the process of MV1=(MV2+2)>>2 is performed on MV2 on the decoding side to enable the reconstruction of the first motion vector.

Next, a composite motion compensated prediction block is cut from the composite reference image block, relative to the position pointed by the obtained second motion vector value MV2 to calculate an error evaluation value. An error evaluation value is not only the sum total of errors by block matching and the like, but can also be calculated as a value obtained by calculating the coding amount and the amount of distortion between the input image and the image after decoding, by taking into account the coding amount necessary for the transmission of a motion vector and the like and the coding amount necessary upon coding, with the obtained composite motion compensated prediction block, a prediction difference block subtracted from the coding target block.

The processes of S506 to S513 are performed on all reference images, and if a reference image is not the last reference image (S514: NO), the next reference image is selected as the first reference image (S515), and execution returns to S506. If a reference image is the last reference image (S514: YES), a second motion vector value having the smallest error evaluation value is selected from the second motion vector values obtained for all the reference images, and information indicating the selected second motion vector value and the first reference image used upon calculating the second motion vector value, together with the error evaluation value, is outputted to the prediction mode determination unit 109 (S516).

The prediction mode determination unit 109 compares the error evaluation values with those in other prediction modes, and decides an optimal prediction mode (S517).

A prediction difference block being the difference between a prediction image of the decided prediction mode and the coding target block, and the additional information related to the prediction mode are encoded (S518) to end the encoding process for one macroblock.

A motion vector value is stored in the motion vector prediction unit 106 to be used for motion vector prediction of the following macroblock, similarly in both cases where the known motion compensated prediction is selected, and where the composite motion compensated prediction is selected. The second motion vector value to be transmitted in the composite motion compensated prediction has a correlation similarly to the known motion compensated prediction, as a motion vector value of the first reference image of when the composition process is not performed; accordingly, it becomes possible to increase referenceable motion vector values of the surrounding blocks and maintain the prediction accuracy of a motion vector, equal to the known prediction, by not managing the second motion vector values separately but handling in the same manner.

Moreover, the number of the coding target block sizes in a macroblock is described as one in the flowchart of FIG. 10. However, it is possible to perform the composite motion compensated prediction in units of block sizes of 16×16, 16×8, 8×16, 8×8, 8×4, 4×8, 4×4, and the like similarly to MPEG-4 AVC. In that case, an error evaluation value of the composite motion compensated prediction is calculated by block size, the block size having the smallest error evaluation value is selected, and the prediction mode is transmitted; accordingly, the decoding apparatus can recognize the selection result.

If refinement_mc_adaptive=1 is transmitted as the slice header information depicted in FIG. 13, the process of adaptively switching between the normal motion compensated prediction and the composite motion compensated prediction is performed.

FIG. 14 depicts an example of additional information to a motion compensated prediction mode in the second embodiment. The switch information is transmitted as one-bit ON/OFF information in units of reference images that transmit a motion vector in accordance with the applied mode if other than intra-frame prediction (Intra) that does not use a motion vector and the direct mode (Direct) that uses only a predicted motion vector value. refmc_on_l0 [mbPartIdx] and refmc_on_l1 [mbPartIdx] in FIG. 14 are relevant information.

In bi-directional prediction (performing addition prediction using two reference images) in a B-slice, it is also possible to select whether to use a composite reference image as a prediction image for each reference image. In combination with the selection of reference images, it is possible to perform the composite motion compensated prediction with two motion vectors based on four reference images at the maximum, and it is possible to further improve the quality of a prediction image.

When the coding of the macroblock ends, if the macroblock is not the last one (S519: NO), the next macroblock is specified (S520), and execution moves to S504. If the macroblock is the last one (S519: YES), the process of encoding one frame is ended.

Figure 15:
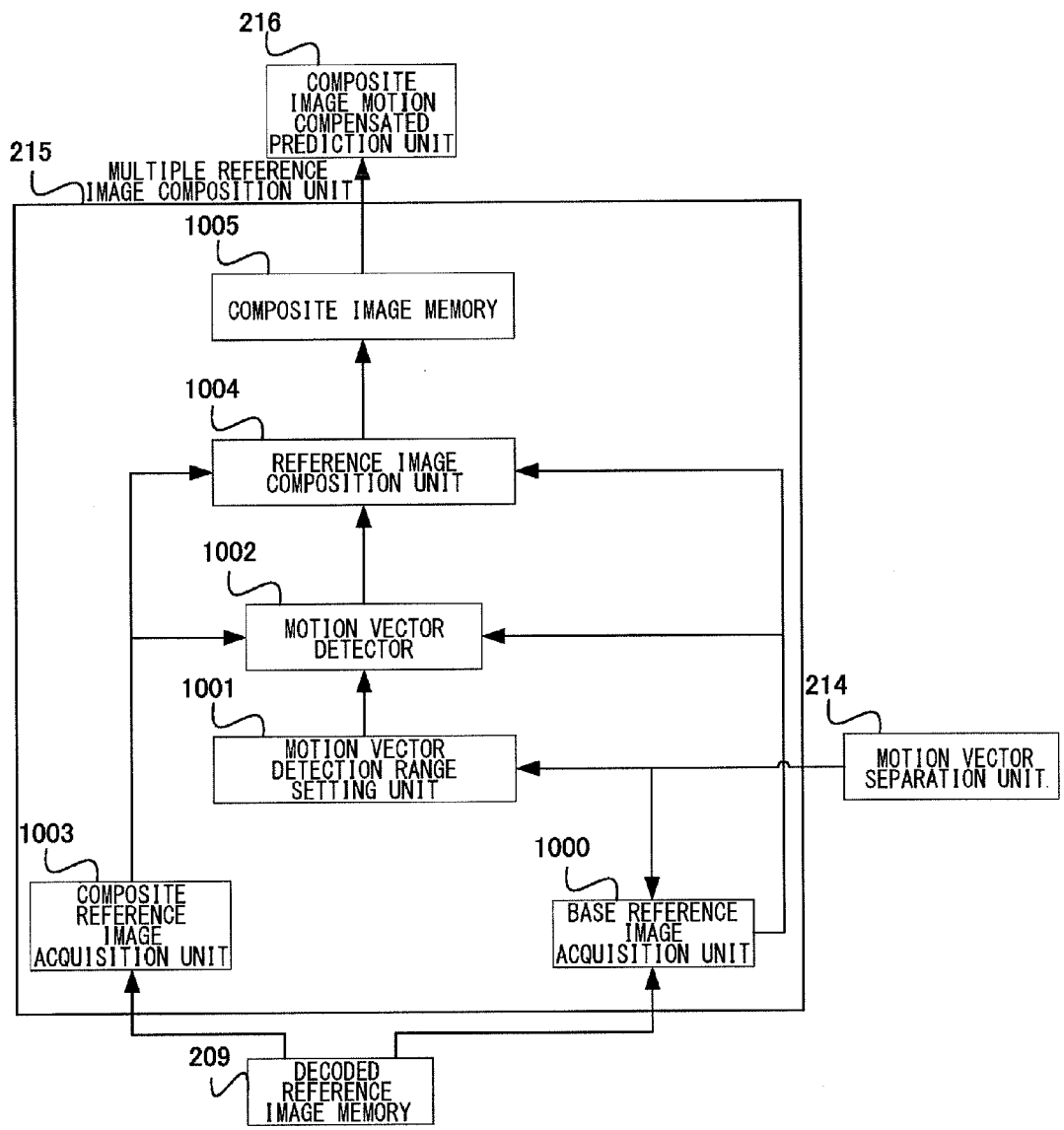
FIG. 15 is a block diagram of the configuration of a multiple reference image composition unit in the video decoding apparatus of the second embodiment of the present invention.
Figure 16:
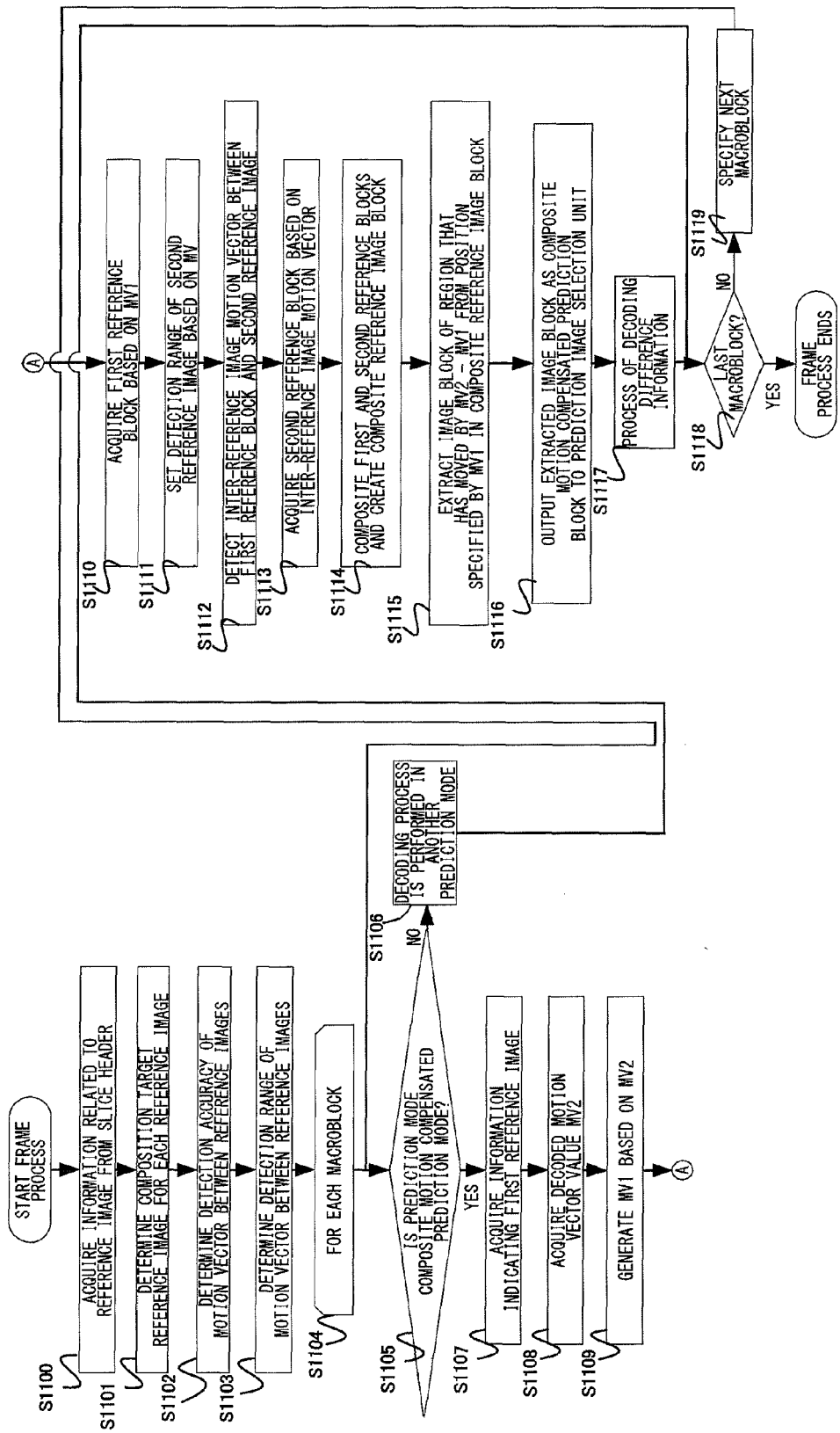
FIG. 16 is a flowchart for explaining the operation of a motion vector separation unit, the multiple reference image composition unit and a composite image motion compensated prediction unit in the video decoding apparatus of the second embodiment of the present invention.

Next, the configuration of the multiple reference image composition unit 215 in the decoding apparatus, which realizes the mechanism of FIG. 8, is depicted in FIG. 15. The flowchart of the composite image motion compensated prediction process that operates in the motion vector separation unit 214, the multiple reference image composition unit 215 and the composite image motion compensated prediction unit 216 is depicted in FIG. 16. The detailed operation will be described.

As depicted in FIG. 15, the multiple reference image composition unit 215 includes a base reference image acquisition unit 1000, a motion vector detection range setting unit 1001, an inter-reference image motion vector detector 1002, a composite reference image acquisition unit 1003, a reference image composition unit 1004, and a composite image memory 1005. Their respective operation is performed similarly to the base reference image acquisition unit 400, the motion vector detection range setting unit 401, the inter-reference image motion vector detector 402, the composite reference image acquisition unit 403, the reference image composition unit 404, and the composite image memory 405, which are depicted in FIG. 9.

Firstly, the motion vector separation unit 214 inputs the motion vector value MV1 generated by the motion vector separation unit 214 from the decoded motion vector value MV2 into the base reference image acquisition unit 1000 and the motion vector detection range setting unit 1001.

Specifically, MV1 is generated by the computation of MV1=(MV2+2)>>2, and it is possible to acquire a motion vector value between the first reference image and the coding target block in the coding apparatus. The base reference image acquisition unit 1000 acquires a reference block of the first reference image from the decoded reference image memory 209, using inputted MV1. The base reference image acquisition unit 1000 outputs the acquired first reference block to the inter-reference image motion vector detector 1002 and the reference image composition unit 1004.

Next, the motion vector detection range setting unit 1001 sets a range to detect a motion vector in between the second reference image in the first reference block. The motion vector detection range setting unit 1001 outputs the information of the set motion vector detection range to the inter-reference image motion vector detector 1002.

The inter-reference image motion vector detector 1002 acquires a reference block of the second reference image in the motion vector detection range specified by the motion vector detection range setting unit 1001 for the first reference block inputted by the base reference image acquisition unit 1000, from the decoded reference image memory 209 via the composite reference image acquisition unit 1003, calculates error values of block matching and the like, and calculates a motion vector having a small error value as an inter-reference image motion vector. The inter-reference image motion vector detector 1002 outputs the calculated inter-reference image motion vector to the reference image composition unit 1004.

The reference image composition unit 1004 receives the inputs of the first reference block from the base reference image acquisition unit 1000, and the inter-reference image motion vector from the inter-reference image motion vector detector 1002. The reference image composition unit 1004 acquires a reference block of the second reference image, which is pointed by the inter-reference image motion vector, from the decoded reference image memory 209 via the composite reference image acquisition unit 1003. Accordingly, a second reference block is obtained. The reference image composition unit 1004 performs the process of compositing the first and second reference blocks. The reference image composition unit 1004 outputs the composited reference block to the composite image motion compensated prediction unit 216 via the composite image memory 1005.

Next, a description will be given of the operation of the composite image motion compensated prediction process using these configurations on the decoding apparatus side with reference to the flowchart of FIG. 16. FIG. 16 also depicts the flow of the operation of the composite image motion compensated prediction in the process of decoding one frame similarly to FIG. 10. With respect to the operation of the other processing units, it is possible to use a known video decoding process such as MPEG-4 AVC.

At the time of starting the process of decoding one frame, firstly, the slice header is decoded to acquire information related to the reference image (S1100). The information indicating the coding order and the information to identify a reference image, which are depicted in FIG. 11, are transmitted in the slice header, and the information related to the composite motion compensated prediction, which is depicted in FIG. 13, is also decoded.

Next, the process of determining a reference image targeted for composition for each reference image is performed (S1101). In the second embodiment, a similar judgment to the process shown in the operation of the coding apparatus is made in the decoding apparatus.

If reference images to be composition targets are determined for all the reference images, then refinement_mc_matching_subpel that has decoded the detection accuracy of a motion vector between reference images is used for the setting (S1102).

Similarly, refinement_mc_matching_range_full that has been decoded from the slice header is used for the setting of the detection range of a motion vector between reference images (S1103).

After the setting is determined in units of frames, the process of creating a composite motion compensated prediction block is performed on a macroblock being the decoding target block in the decoding target frame if the composite motion compensated prediction is used.

For each macroblock (S1104), firstly, if the prediction mode is not the composite motion compensated prediction mode (S1105: No), the prediction process is performed in another prediction mode, and the decoding process is performed using the created prediction image (S1106).

If the prediction mode is the composite motion compensated prediction mode (S1105: YES), information indicating the first reference image is acquired (S1107). The information indicating the reference image is encoded together with the prediction mode similarly to MPEG-4 AVC, and can be acquired together with the decoded prediction mode information of a macroblock.

Next, the motion vector value MV2 decoded in the motion vector prediction decoder 212 is acquired (S1108). The separation process is performed on MV2 in the motion vector separation unit 214 to generate MV1 (S1109). Specifically, the computation of MV1=(MV2+2)>>2 is made as described above.

Next, the first reference block is acquired using MV1 (S1110). As described in the explanation of FIG. 9, acquired as the first reference block is a reference image of a region of ±3 pixels in addition to the coding target block size, as a region necessary to create a reference image at ¼ pixel accuracy, the region being equal to the target block±½ pixel or more, relative to the position in the first reference image, the position having moved by the value of MV1.

Next, the detection range of the second reference image is set based on the first motion vector (S1111). The same selection of a reference image to be used for the second reference image as the coding apparatus is made by the definition decided in S1101. With respect to the detection range, the detection range set in S1103 is used. The detection of an inter-reference image motion vector between the first reference block and the second reference image is performed on the set detection range (S1112).

Next, the second reference block is acquired using the detected inter-reference image motion vector (S1113). The second reference block acquires a reference image of a region of the coding block size±3 pixels similar to the first reference block, relative to the position in the second reference image, the position having moved by the motion vector value between reference images with respect to the first reference block.

Next, the first and second reference blocks are composited to create a composite reference image block (S1114).

Next, an image block of a region that has moved by MV2−MV1 with respect to the position specified by MV1, in other words, a region corresponding to the position specified by MV2 is extracted from the composited reference image block (S1115). MV1 is at 1 pixel accuracy and MV2 is at ¼ pixel accuracy; accordingly, the ¼ pixel component to move is generated by the computation of MV2−(MV1<<2). The extracted image block is outputted as the composite motion compensated prediction block to the prediction image selection unit 204 (S1116).

Next, the decoding process is performed on the difference information using the above composite motion compensated prediction block (S1117); accordingly, the decoding process for one macroblock ends. If the macroblock on which the decoding process has been performed is not the last macroblock of one frame (S1118: NO), a macroblock to be decoded next is specified (S1119), and execution returns to S1105.

If the last macroblock of one frame is decoded (S1118: YES), the process for one frame is complete.

In the composite image motion compensated prediction process in the decoding apparatus in the second embodiment, the final value of MV2 is known in advance. Accordingly, with respect to the first reference block, it is also possible to perform the composition process by acquiring only a reference image block in units of 1 pixel of the coding target block size, detecting a motion vector between reference images, and creating a reference image in units of ¼ pixel, which becomes necessary upon creating a composite reference image. It is possible to create the same composite reference image as that of the coding apparatus while reducing an increase in the amount of computation due to the filtering process upon decoding.

The video coding apparatus and the video decoding apparatus of the second embodiment of the present invention composite a reference image on which motion compensated prediction has been performed by obtaining a motion vector between the coding target block and the first reference image, and another reference image, and detect (correct) a motion vector in a minute range in the composited prediction image. Accordingly, it is possible to create a motion compensated prediction image having few prediction residuals where the quality of the prediction image was improved and subsequently motion was corrected taking into account phase shifts of an edge part and the like after the improvement.

Furthermore, assuming that the accuracy of the motion vector obtained for the first reference image is N pixel accuracy, the range of the motion vector detection (correction) to be performed on the composited prediction image is set to ±N/2 pixel, a correction at higher accuracy than N pixels is made, and a motion vector value that is the correction result is transmitted. Accordingly, one motion vector value makes it possible to acquire a motion compensated prediction image from the first reference image on the decoding apparatus side, and acquire a motion compensated prediction image where a phase shift of the composited prediction image has been corrected. Hence, it makes it possible to code and decode a motion compensated prediction image having few prediction residuals without increasing the amount of additional information.

Moreover, if a motion vector value for the first prediction image is predicted based on motion vector values of already-decoded surrounding blocks, only a correction value for the composited prediction image is received as the motion vector value to be decoded, and it is possible to further reduce the amount of information on motion vectors.

In the second embodiment of the present invention, a motion vector value between the motion compensated prediction image predicted using the first reference image and another reference image is obtained, and the average of the predicted motion compensated prediction image and the motion compensated prediction image acquired from the another reference image is taken. Accordingly, it is possible to create a prediction image that has dealt with the removal of a coding degradation component and a minute change in luminance of a decoding target object, and it is possible to improve coding efficiency.

With respect to the second motion vector, a composite reference image is created using one determined result in the coding apparatus, and the composite motion compensated prediction is performed. However, also if a plurality of first motion vectors are prepared, the composite motion compensated prediction is performed in the same method with each motion vector as a reference, and an optimal second motion vector is encoded, the decoding apparatus can perform decoding without increasing the amount of computation in the process described in the second embodiment, and optimal composite motion compensated prediction at M pixel accuracy is made possible based on a judgment in units of N pixels also in the coding apparatus. Appropriate composite motion compensated prediction is made possible, suppressing an increase in the amount of the encoding process compared with the first embodiment.

Third Embodiment

Next, a description will be given of a video coding apparatus and a video decoding apparatus in a third embodiment. In the third embodiment, the configurations of the video coding and decoding apparatuses take similar configurations to those of the second embodiment, and only the process of compositing reference images in the multiple reference image composition unit operates differently. Specifically, only the computation processes performed in the reference image composition units 404 and 1004, and S511 and S1114 of the flowcharts in the explanation of the second embodiment are different.

Figure 17:
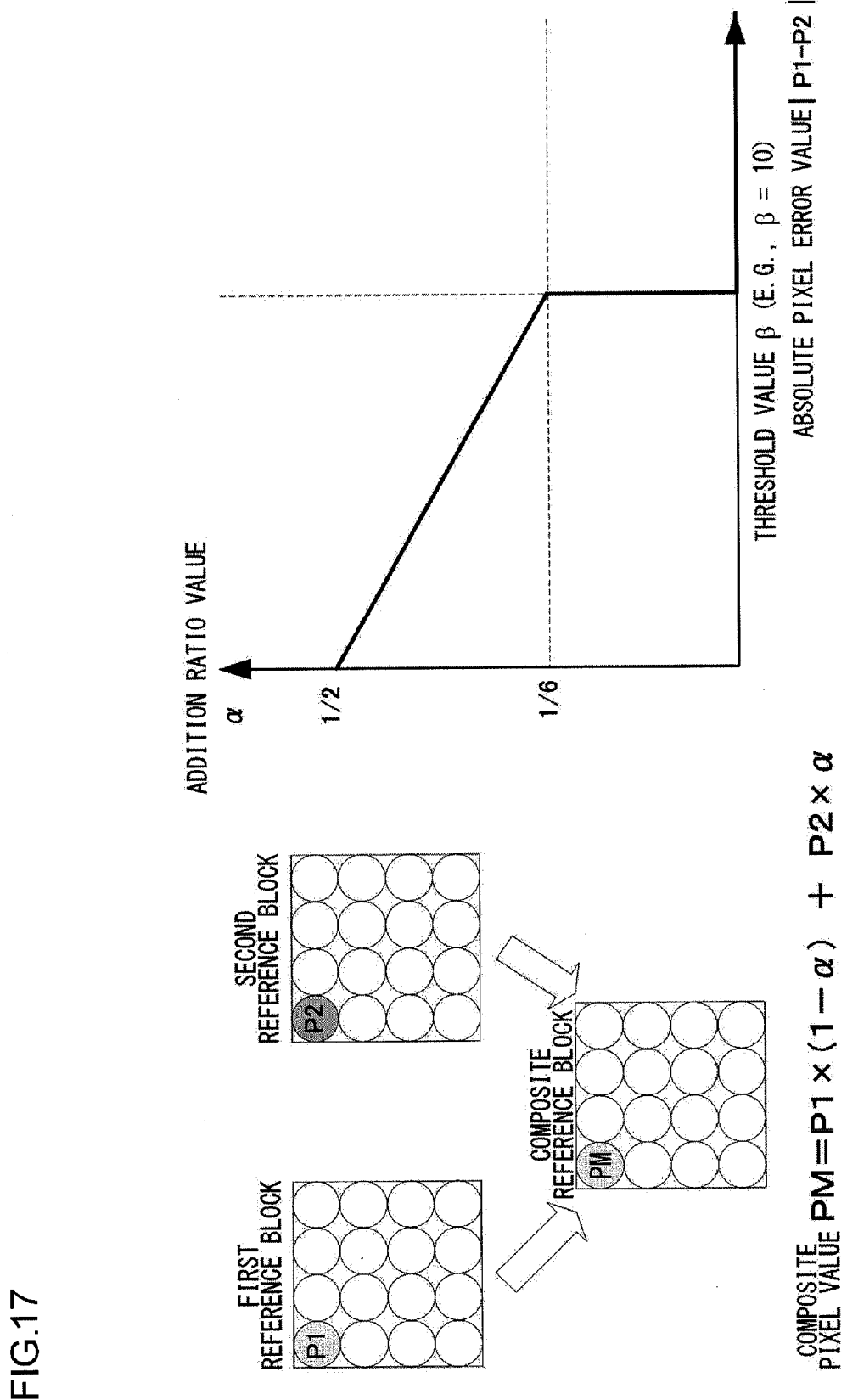
FIG. 17 is a conceptual diagram of the operation of a process of compositing reference images in a third embodiment of the present invention.

FIG. 17 depicts a conceptual diagram of the operation of the process of compositing reference images in the third embodiment, and the computation process will be described. In the second embodiment, the averaging to perform a uniform averaging process is performed on all pixel values in a block in the composition process. However, in composition process of the third embodiment, an error value between the first and second reference blocks is calculated on a pixel basis and the weight between the second reference block and the first reference block on a pixel basis is changed in accordance with the absolute value of the error to calculate a weighted average value.

Specifically, the configuration of a motion adaptive filter where if there are few errors, the weights are assigned equally, and if equal to the threshold value or more, a pixel of the second reference block is not added is taken. Assuming that a pixel value of the first reference block is P1 and a pixel value of the second reference block is P2, α being an addition ratio value is calculated from an absolute pixel error value |P1−P2| by the function depicted in FIG. 17. A composite pixel value PM for each pixel, which uses the calculated α, is calculated by PM=P1×(1−α)+P2×α.

With respect to these composition processes, the coding and decoding apparatuses can implicitly perform the same operation; however, it is also possible to transmit information indicating whether to perform a simple average on a slice header and the like, or adaptive addition on a pixel basis for selection.

If a simple average in the second embodiment is performed, it is possible to create a prediction image having a characteristic corresponding to the average value prediction from two reference images with one motion vector. On the other hand, if adaptive addition in the third embodiment is performed, distortion caused by the degradation of coding and the like in the first reference block is removed while a signal characteristic is preserved for a part that have a big change such as an edge component or the like. Accordingly, a prediction image where the quality of the first reference image block has been improved is created in the process common to coding and decoding with the first reference block as a base. Therefore, in the video coding apparatus and the video decoding apparatus in the third embodiment, it is possible to maintain a signal characteristic of a feature part such as an edge component and create a high-quality prediction image where the coding degradation component has been removed, in addition to the effect of the first embodiment, and coding efficiency is improved.

Also if the number of reference images is only one in the coding structure depicted in FIG. 11, the first reference image is specified as the second reference image and a texture component in the first reference image is adaptively added by block matching; accordingly, it becomes possible to remove degradation components, and it is possible to exhibit an excellent effect with the configuration of the present invention.

Fourth Embodiment

Next, a description will be given of a video coding apparatus and a video decoding apparatus of a fourth embodiment. The fourth embodiment is characterized by taking a configuration where a plurality of second reference images in the multiple reference image composition unit is used while configuring the unit of a block of the detection of a motion vector from the second reference image for the first reference block so as to be the unit of a block smaller than a coding target block.

Figure 18:
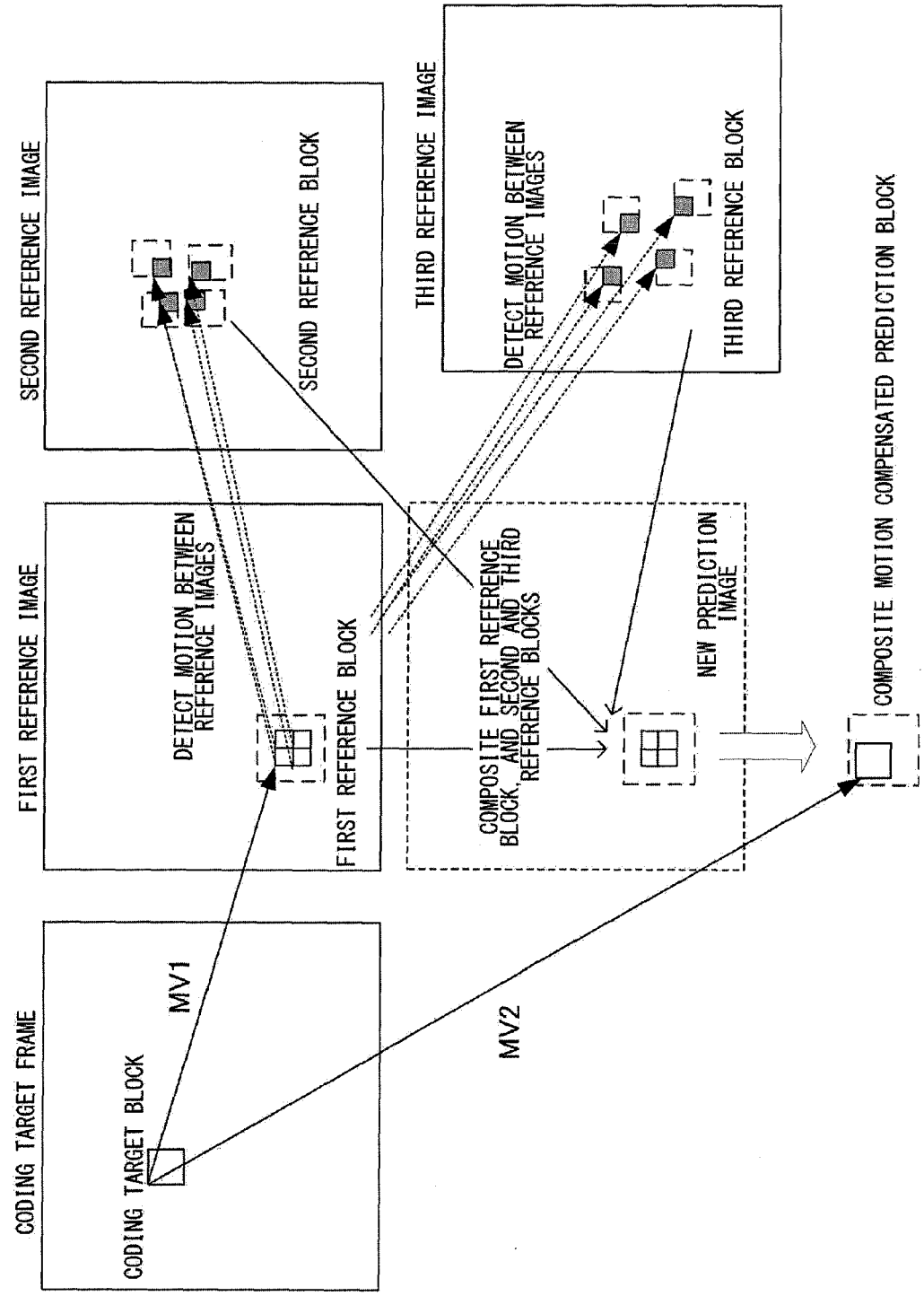
FIG. 18 is a conceptual diagram of the operation of a composite image motion compensated prediction process in a fourth embodiment of the present invention.

FIG. 18 is a conceptual diagram of the operation of the composite image motion compensated prediction process in the fourth embodiment of the present invention. The relationship between the coding apparatus side and the decoding apparatus side is a similar relationship to that of the second embodiment depicted in FIG. 8; accordingly, only the conceptual diagram of the operation of the coding apparatus side is depicted.

On the coding apparatus side, the process of detecting the motion vector between a coding target frame and a first reference image being a base reference image to create MV1 is performed similarly to the first embodiment.

Next, a reference block cut from the first reference image based on MV1 is partitioned into blocks smaller than a coding target block, and an inter-reference image motion vector pointing to a second reference image is detected in units of small blocks. As an example, if the coding target block is 16×16 pixels that is the same size as that of the macroblock, the unit to obtain an inter-reference image motion vector is set to 8×8 pixels. A plurality (four in the example) of detected inter-reference image motion vectors pointing to the second reference image is used to create a plurality of reference blocks in units of small blocks, which are composition targets in a target region of the first reference block.

With respect to an image around the target block upon creating the second reference block, as depicted in FIG. 18, only a region that is not included in the other partitioned blocks can also be acquired in units of small blocks. However, it is also possible to acquire a surrounding region of ±3 pixels, similarly to the first embodiment, in all the small blocks to use for the composition process, and it is possible to create a composite image where the boundaries of the small blocks are smoothly connected. A second reference block corresponding to the first reference block is created, using a plurality of reference blocks that are the above small blocks.

Next, motion vectors between reference images are similarly detected for a third reference image that is different from the second reference image. Inter-reference image motion vectors pointing from the first reference block are similarly detected in units of small blocks for the third reference image. A plurality of reference blocks are created based on the detected inter-reference image motion vectors, and a third reference block corresponding to the first reference block is created using the plurality of reference blocks.

In the composition process, it is determined using a pixel value of the first reference block and pixel values of the second and third reference blocks whether to composite the first reference block and the second reference block or the third reference block or both of the second and third reference blocks on a pixel or small-block basis.

Similarly to the first embodiment, a motion vector at M pixel accuracy from the coding target is detected by means such as block matching in the prediction image including the surroundings, which has been composited in this manner, and a second motion vector value MV2, which has been detected as a result, is encoded and transmitted as a motion vector between the coding target block and the first reference image and a composited prediction image specified by MV2 is subtracted from the coding target block as a composite motion compensated prediction block to encode and transmit the difference block.

Figure 19:
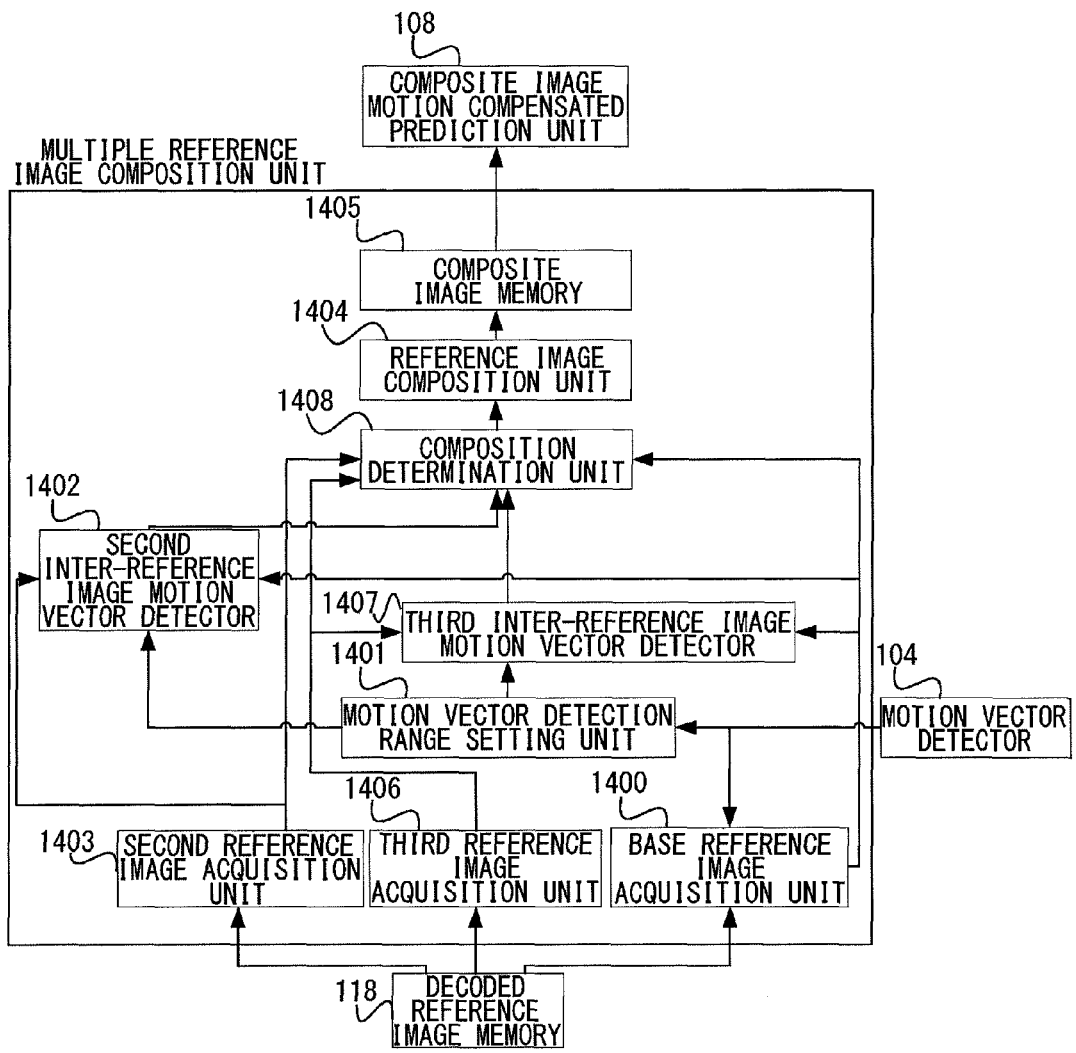
FIG. 19 is a block diagram of the configuration of a multiple reference image composition unit in a video coding apparatus and a video decoding apparatus of the fourth embodiment of the present invention.
Figure 20:
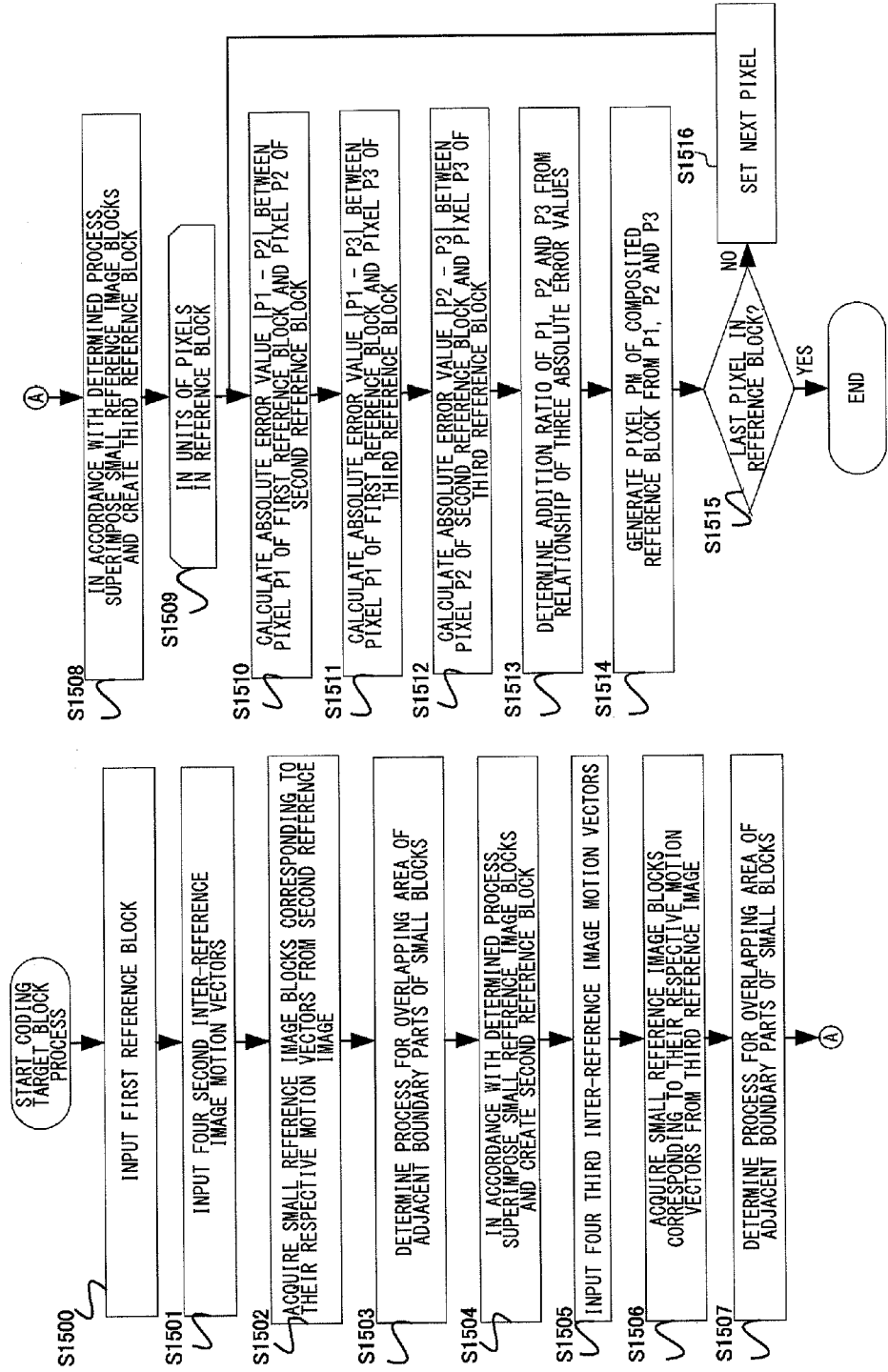
FIG. 20 is a flowchart for explaining the operation of a composition determination unit in the video coding apparatus and the video decoding apparatus of the fourth embodiment of the present invention.

The configurations of the coding and decoding apparatuses in the fourth embodiment also take similar configurations to those of the second embodiment; however, the configuration and process of the multiple reference image composition unit are different. FIG. 19 depicts a block diagram of the configuration of the multiple reference image composition unit of the fourth embodiment, and FIG. 20 depicts the flowchart for explaining the operation. A description will be given of the fourth embodiment. The configuration and operation of the multiple reference image composition unit in the coding and decoding apparatuses are different only in the operation of the processing blocks connected to the multiple reference image composition unit, and similar operation is performed. Therefore, the behavior in the coding apparatus is shown for explanation.

As depicted in FIG. 19, the multiple reference image composition unit in the fourth embodiment includes a base reference image acquisition unit 1400, a motion vector detection range setting unit 1401, a second inter-reference image motion vector detector 1402, a second reference image acquisition unit 1403, a reference image composition unit 1404, a composite reference image memory 1405, a third reference image acquisition unit 1406, a third inter-reference image motion vector detector 1407, and a composition determination unit 1408. It is configured that the operation in the third reference image acquisition unit 1406, the third inter-reference image motion vector detector 1407, and the composition determination unit 1408 brings new effects in the fourth embodiment, compared with the multiple reference image composition unit of the first embodiment. However, with respect to the third reference image acquisition unit 1406 and the third inter-reference image motion vector detector 1407, it is also possible to integrate the second inter-reference image motion vector detector 1402 and the second reference image acquisition unit 1403, respectively, to operate with the configurations of the inter-reference image motion vector detector 402 and the composite reference image acquisition unit 403 as in the configurations in the second embodiment. In FIG. 19, they are depicted as separate blocks for an explanation of the operation.

Firstly, the motion vector detector 104 inputs a motion vector value MV1 between a first reference image and a coding target block into the base reference image acquisition unit 1400 and the motion vector detection range setting unit 1401. The base reference image acquisition unit 1400 acquires a reference block of the first reference image from the decoded reference image memory 117, using inputted MV1. A region to acquire the reference block takes up a region necessary to create a reference image at M pixel accuracy (M<N), the region being equal to the target block±N/2 pixel or more relative to the position in the first reference image, the position having moved by the value of MV1 from the coding target block. The base reference image acquisition unit 1400 outputs the acquired first reference block to the second inter-reference image motion vector detector 1402, the composition determination unit 1408, and the third inter-reference image motion vector detector 1407.

Next, the motion vector detection range setting unit 1401 sets, for the first reference block, a range to detect a motion vector in between with a second reference image and a range to detect a motion vector in between with a third reference image. With respect to the algorithm for setting a detection range, a similar process to that of the detection range setting in the first embodiment is performed individually for the inter-reference image motion vector detection in between with the second reference image and the inter-reference image motion vector detection in between with the third reference image to determine ranges. The motion vector detection range setting unit 1401 outputs the information of the set motion vector detection ranges to the second inter-reference image motion vector detector 1402 and the third inter-reference image motion vector detector 1407.

The second inter-reference image motion vector detector 1402 acquires a reference block of the second reference image in the motion vector detection range specified by the motion vector detection range setting unit 1401 for the first reference block inputted by the base reference image acquisition unit 1400, from the decoded reference image memory 117 via the second reference image acquisition unit 1403, calculates error values of block matching and the like by 8×8 block size being the size a quarter of the coding target block, and calculates a motion vector having a small error value as a second inter-reference image motion vector. The second inter-reference image motion vector detector 1402 outputs the calculated four second inter-reference image motion vectors to the composition determination unit 1408.

Similarly, the third inter-reference image motion vector detector 1407 acquires a reference block of the third reference image in the motion vector detection range specified by the motion vector detection range setting unit 1401 for the first reference block inputted by the base reference image acquisition unit 1400, from the decoded reference image memory 117 via the third reference image acquisition unit 1406, calculates error values of block matching and the like by 8×8 block size being the size a quarter of the coding target block, and calculates a motion vector having a small error value as a third inter-reference image motion vector. The third inter-reference image motion vector detector 1407 outputs the calculated four third inter-reference image motion vectors to the composition determination unit 1408.

The composition determination unit 1408 creates a second reference block corresponding to the first reference block from the decoded reference image memory 117 via the second reference image acquisition unit 1403 using a plurality of reference blocks of the second reference image, which are pointed by the four second inter-reference image motion vectors inputted by the second inter-reference image motion vector detector 1402 for the first reference block inputted by the base reference image acquisition unit 1400.

The composition determination unit 1408 similarly creates a third reference block corresponding to the first reference block from the decoded reference image memory 117 via the third reference image acquisition unit 1406, using a plurality of reference blocks of the third reference image, which are pointed by the four third inter-reference image motion vectors inputted by the third inter-reference image motion vector detector 1407.

The composition determination unit 1408 calculates error values between the subsequently created second reference block and third reference block, and the first reference block, and selects the second and third reference blocks to be composited and determine the addition ratio, for the first reference block, using the relationship of the error values. The algorithm for determination will be described later.

The composition determination unit 1408 composites the first reference block, and the second reference block and the third reference block using the determined addition ratio to create a composited reference block, and outputs the composited reference block to the composite image motion compensated prediction unit 108 via the composite image memory 1405.

Next, FIG. 20 depicts the flowchart for explaining the operation of the determination process in the composition determination unit 1408, and the detailed operation will be described. Firstly, the first reference block is inputted in the unit of the coding target block (S1500). The reference image block acquires a region of ±3 pixels considering a filter coefficient, for movement by the amount of motion in units of ¼ pixel within a range of ±½ pixel in relation to the size of the coding target block to be performed by the composite motion compensated prediction unit (acquires a region of 22×22 pixels if the coding target block is 16×16 pixels).

Next, the four second inter-reference image motion vectors calculated by the second inter-reference image motion vector detector 1402 are inputted (S1501). Small reference image blocks in units of 8×8 pixels are acquired from the second reference image using their respective inputted motion vectors (S1502). A region to acquire the small reference image block is 14×14 pixels.

With respect to the adjacent parts of the small reference image blocks, it is judged whether to reflect pixels in an overlapping area of the adjacent reference image blocks (S1503). Specifically, if the difference value of the acquired adjacent motion vectors is ±1 pixel or smaller, the pixels are overlapped to smoothly connect the block adjacent parts. If larger than ±1 pixel, it is judged to be a reference block obtained for a different object, and the overlapping area is not reflected, and the pixels of the relevant small reference block are set as they are. Following the above judgment, the small reference image blocks are superimposed to create a second reference block constructed of 22×22 pixels (S1504).

Next, the four third inter-reference image motion vectors calculated by the third inter-reference image motion vector detector 1407 are inputted (S1505). Similarly to the case of the second reference image, small reference image blocks are acquired from the third reference image using their respective motion vectors (S1506), the process on the adjacent border parts of the small reference image blocks is determined (S1507), and the small reference image blocks are superimposed to create a third reference block (S1508).

Next, the composition process is performed in units of pixels using the first, second and third reference blocks. In units of pixels in the reference block (S1509), an absolute error value |P1−P2| between a pixel value P1 of the first reference block and a pixel value P2 of the second reference block is calculated (S1510). Similarly, an absolute error value |P1−P3| between P1 and a pixel value P3 of the third reference block is calculated (S1511), and an absolute error value |P2−P3| between P2 and P3 is calculated (S1512).

The addition ratio of P1, P2 and P3 is determined using three values of |P1−P2|, |P1−P3|, and |P2−P3| (S1513) to make a judgment of the composition process in the third embodiment.

Firstly, if both of |P1−P2| and |P1−P3| are smaller than a threshold value β (e.g., 8), the same weights are assigned to P1, P2 and P3 to be averaged. In other words, the ratio of P1, P2 and P3 is 1:1:1.

Next, if |P1−P2| is smaller than the threshold value β, and |P1−P3| is larger than a threshold value γ (e.g., 16), only P2 is added to P1. In other words, the ratio of P1, P2 and P3 is 1:1:0. If the relation between P2 and P3 is opposite, in other words, if |P1−P3| is smaller than the threshold value β, and |P1−P2| is larger than the threshold value γ (e.g., 16), the ratio of P1, P2, and P3 is 1:0:1.

If both of |P1−P2| and |P1−P3| are larger than the threshold value γ, the value of |P2−P3| is examined. If |P2−P3| is smaller than a threshold value δ (e.g., 4), it is judged that an error caused by a factor such as degradation is occurring in the pixel value of P1, and the addition process is performed in a direction to update the pixel value using P2 and P3. Specifically, the ratio of P1, P2 and P3 is set to 1:2:2. Moreover, if |P2−P3| is larger than the threshold value γ, P2 and P3 are removed from the composition targets, the addition ratio of P1, P2 and P3 becomes 1:0:0.

In the case of other than the above conditions, the average value of P2 and P3 are averaged in relation to P1. In other words, the ratio of P1, P2 and P3 becomes 2:1:1. The weighted average of P1, P2 and P3 is taken in accordance with the ratio determined in this manner to generate a pixel value PM of the composited reference block (S1514).

A similar process is performed on all pixels in the reference block. If the pixel is not the last one in the reference block (S1515: NO), the next pixel is set (S1516), and execution returns to S1510. If the pixel is the last one in the reference block (S1515: YES), the process of compositing reference images for the coding target block ends.

In the video coding apparatus and the video decoding apparatus in the fourth embodiment, for the motion compensated prediction image predicted using the first reference image, motion vector values in between with another reference image in smaller units than that of a targeted motion compensated prediction image are obtained, and the process of compositing the predicted motion compensated prediction image and the motion compensated prediction images acquired in small units in accordance with the respective motion vectors is performed. Accordingly, it is possible to create a prediction image corresponding to a minute temporal transformation of the object of a coding target object without increasing the amount of motion vector information to be transmitted, and coding efficiency is improved. Moreover, the composition process is performed by obtaining a correlation between a motion compensated prediction image predicted using the first reference image and another reference image, and selecting a plurality of reference images suitable for composition. Accordingly, it is possible to create an appropriate composite image based on the plurality of reference images without transmitting additional information, and further coding efficiency is improved.

Fifth Embodiment

Next, a description will be given of a video coding apparatus and a video decoding apparatus in a fifth embodiment. The fifth embodiment is characterized by taking a configuration where in the multiple reference image composition unit, a super resolution enlargement process is performed on the first reference image, using a plurality of reference images, and the enlarged image as a result of super resolution enlargement is used as a composite reference image for motion compensated prediction.

Figure 21:
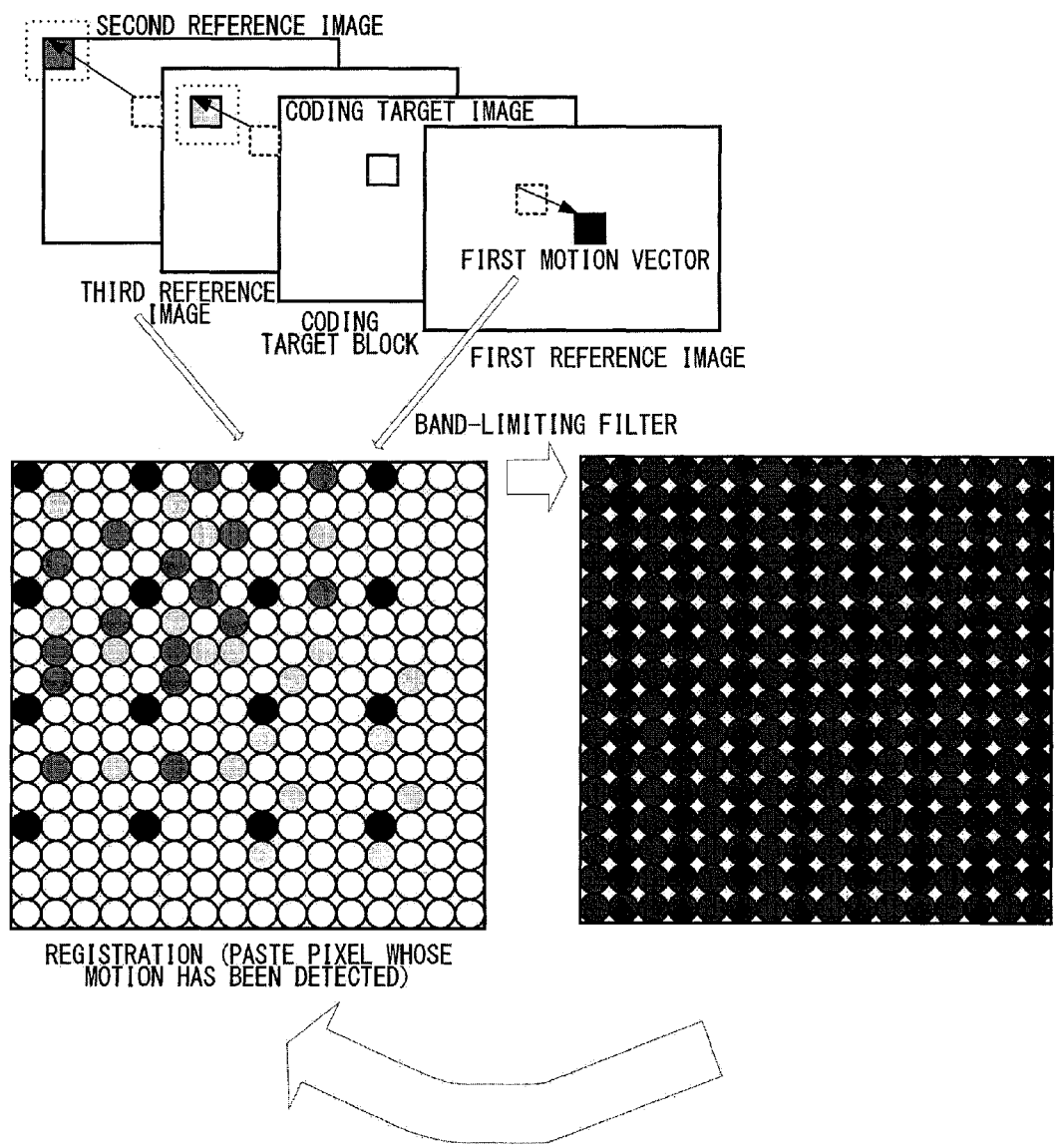
FIG. 21 is a conceptual diagram of the operation of a composite image motion compensated prediction process in a fifth embodiment of the present invention.

Firstly, a conceptual diagram of the operation of the composite image motion compensated prediction process in the fifth embodiment is depicted in FIG. 21 and will be described. In the configurations of the first to fourth embodiments, pixel values at fractional pixel accuracy less than 1 pixel are generated by filtering their respective reference images, and the reference images after the generation are used to create a composite reference image. However, in the fourth embodiment, the pixel values of the first reference image, which has been enlarged, at fractional pixel accuracy less than 1 pixel are generated by pasting from other reference images, and the frequency band after pasting is adjusted; accordingly, a high-definition reference image where the influence of degradation of coding is reduced is created.

As depicted in FIG. 21, a second reference image and a third reference image in specific ranges are set for a first reference image acquired based on a first motion vector detected between a coding target block and a first reference image. Motion detection in relation to the first reference block is performed on the pixels in the specific ranges. An enlarged reference block at fractional pixel accuracy is created by pixel pasting (registration). Filtering to adjust to a predetermined band is performed, and the components are reflected.

By repeating the above process several times, the degradation of coding in the first reference block is removed to create a high-definition reference image at fractional pixel accuracy. The high-definition reference signal generated in this manner is used for the composite image motion compensated prediction to create a prediction image having few high frequency components of prediction residuals.

Figure 22:
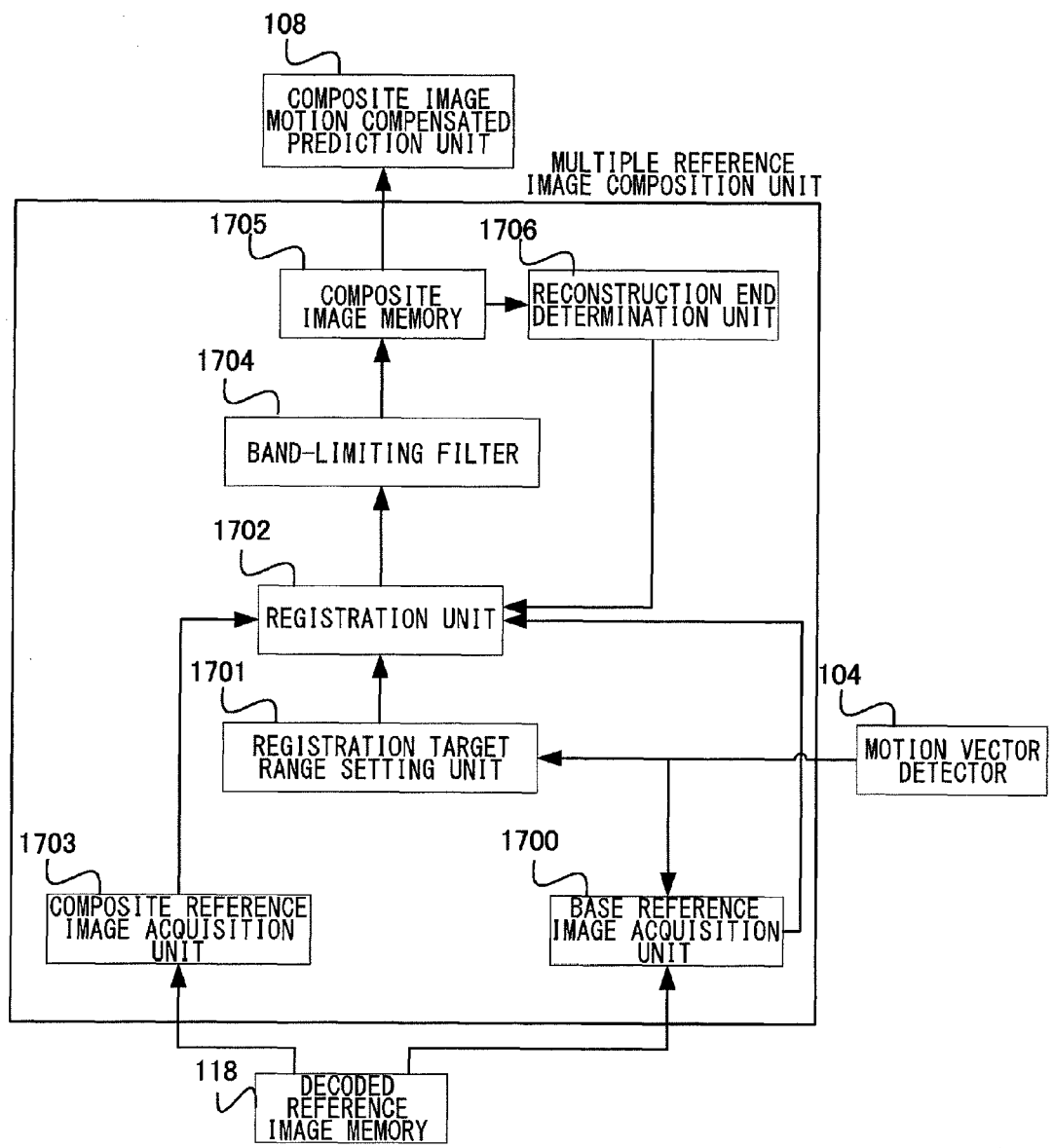
FIG. 22 is a block diagram of the configuration of a multiple reference image composition unit in a video coding apparatus and a video decoding apparatus of the fifth embodiment of the present invention.

A block diagram of the configuration of the multiple reference image composition unit in the video coding apparatus and the video decoding apparatus of the fifth embodiment is depicted in FIG. 22, and the operation will be described. Similarly to the fourth embodiment, also in the fifth embodiment, the configuration and operation of the multiple reference image composition unit in the coding and decoding apparatuses are different only in the operation of the processing blocks connecting to the multiple reference image composition unit, and similar operation is performed. Therefore, the behavior in the coding apparatus is shown for explanation.

As depicted in FIG. 22, the multiple reference image composition unit in the fifth embodiment includes a base reference image acquisition unit 1700, a registration target range setting unit 1701, a registration unit 1702, a composite reference image acquisition unit 1703, a band limit filter 1704, a composite image memory 1705, and a reconstruction end determination unit 1706.

Firstly, the motion vector detector 104 inputs a motion vector value MV1 between a first reference image and a coding target block into the base reference image acquisition unit 1700 and the registration target range setting unit 1701. The base reference image acquisition unit 1700 acquires a reference block of the first reference image from the decoded reference image memory 117, using inputted MV1. The base reference image acquisition unit 1700 outputs the acquired first reference block to the registration unit 1702.

Next, the registration target range setting unit 1701 sets an area to be a target for registration from another reference image in relation to the first reference block. Specifically, similarly to the detection range of a motion vector between reference images in the first embodiment, which is depicted in FIG. 12, a range of ±L pixels, centering the position pointed by the amount of motion where MV1 is extended or reduced, is set as a target area on which registration is performed in accordance with a distance from the coding target image. The value of L needs a range larger than the detection range of a motion vector between reference images in the first embodiment, and for example, it is set to L=32.

The target area set in the registration target range setting unit 1701 is transmitted to the registration unit 1702, and the registration process is performed. Firstly, the registration unit 1702 performs an enlargement process of X times horizontally and vertically on the first reference block. In the embodiment, assuming X=4, an enlarged image that enables its use for motion compensation in units of ¼ pixel is created.

In the enlarged image, different processes are performed on pixels in units of 1 pixel where pixel values exist and pixels created by the enlargement process, in the registration process. As depicted in FIG. 21, a motion vector is calculated by block matching at intervals of 1 pixel between the first reference block enlarged in units of predetermined pixels (e.g., 4×4 pixels) and a reference block constructed in units of 1 pixel of another reference image acquired from the decoded reference image memory 117 via the composite reference image acquisition unit 1703. If the calculated motion vector does not point a position at 1 pixel accuracy, a pixel from the another reference image is pasted for a pixel that did not exist before; accordingly, the pasted pixel value is replaced with a pixel value generated by a filter. If the motion vector points a position at 1 pixel accuracy, and pixels are pasted to the same position from a plurality of reference images, the most appropriate values to be at that position is calculated based on the distribution and frequency of the respective pixel values pasted to the pixel position after registration, and the pixel values are replaced with the values.

The registered reference block is outputted from the registration unit 1702 to the band limit filter 1704. The band limit filter 1704 performs band-limiting filtering where the frequency characteristic that the enlarged reference image originally has is assumed, on the inputted reference block after registration.

The value of the position of a pixel other than 1 pixel accuracy, which has not been pasted upon registration, is filtered by the band-limiting filter, without using a value generated upon first enlargement, but using a surrounding registered pixel value. Accordingly, the influence of registration is reflected also on a pixel value at a position that has not been pasted.

The reference block as a result of band-limiting filtering is stored by the band limit filter 1704 in the composite image memory 1705. The composite image memory 1705 sends the stored reference block to the reconstruction end determination unit 1706.

The reconstruction end determination unit 1706 reserves the previous band-limiting filtered reference block, the block having been sent from the band limit filter 1704, therein for comparison with the inputted reference block. If a change becomes small as a comparison result (the amount of change is smaller than the previous change), and a current change is small, it is judged that the reconstruction process for super resolution is complete, and the reconstruction end determination unit 1706 ends the composition process from a plurality of reference images for the current coding target block.

Upon ending, the stored reference block is outputted from the composite image memory 1705 to the composite image motion compensated prediction unit 108. If not ending, in relation to the previous band-limiting filtered reference block, the difference between the stored reference block and the previous band-limiting filtered reference block is filtered by a filter having an inverse characteristic of the band-limiting filter to extract high-frequency components, an updated image of the reference block on which the created high-frequency component information is reflected is inputted into the registration unit 1702 again, and the registration process from another reference image is performed again. The registration process is repeated several times to reconstruct high-definition components on the reference block in stages, and a high-quality reference block is created.

With respect to the specific super resolution process including registration and its reflection, there is a method other than the configuration of the fifth embodiment, and also in the case where the method is applied, there is an effect that motion compensated prediction by a composite reference image on which the super resolution process has been performed can be realized without transmitting an additional motion vector.

According to the video coding apparatus and the video decoding apparatus in the fifth embodiment, an image on which the super resolution process is performed using another reference image is set as a prediction image for a motion compensated prediction image predicted using the first reference image. Accordingly, a prediction image where high-frequency components that the reference image lost have been reconstructed is created, and motion vector detection where a fine phase adjustment is made to the super-resolved reference image is performed to make it possible to transmit a motion vector that takes into account the phase of the high-frequency component. Therefore, a new effect that the prediction residuals of high-frequency components can be dramatically reduced without an increase in the amount of additional information is added.

The video coding and decoding apparatuses presented as the first, second, third, fourth and fifth embodiments can be physically realized by a computer including a CPU (Central Processing Unit), a recording device such as memory, a display device such as a display, and communication means to a transmission channel, and means including each of the presented functions can be realized as a program on a computer to be executed. Moreover, the program can also be provided by being recorded in a recording medium that can be read by a computer and the like, can also be provided from a server via a wired or wireless network, and can also be provided as data broadcasting of a ground wave or satellite digital broadcasting.

The present invention has been described based on the embodiments. The embodiments are illustrations, and those skilled in the art can understand that various modifications can be made in the combinations of these elements and processing processes, and such modifications also fall within the scope of the present invention.

What is claimed is:

1. A video coding apparatus comprising:
a motion vector detector configured to detect a first motion vector from a first reference image for a coding target block;
a reference image composition unit configured to create a composite reference block that a first reference block of a specific region having a size equal to the coding target block or larger, the first reference block having been extracted from the first reference image using the first motion vector, has been composited with a predetermined region of at least one of other reference images;
a motion compensated prediction unit configured to detect a second motion vector corresponding to the coding target block for the composite reference block by searching the specific region in the composite reference block, extract a block of the same size as the coding target block from the composite reference block using the second motion vector, and set the extracted block as a prediction block; and a coding unit configured to code a prediction difference block that the prediction block has been subtracted from the coding target block, and the second motion vector, wherein the accuracy of the first motion vector is N pixel accuracy (N is a real number), and the accuracy of the second motion vector is M pixel accuracy (M is a real number: M<N), and the specific region has a region equal to a target block ±N/2 pixel or more, relative to a position in the first reference image, the position being pointed by the first motion vector or a vector value that has converted the first motion vector to N pixel accuracy (N is a real number), and a range to detect the second motion vector is within a range of ±N/2 with respect to the first motion vector value.

2. A video coding apparatus comprising:

a motion vector detector configured to detect a first motion vector from a first reference image for a coding target block;

a reference image composition unit configured to create a composite reference block that a first reference block of a specific region having a size equal to the coding target block or larger, the first reference block having been extracted from the first reference image using the first motion vector, has been composited with a predetermined region of at least one of other reference images;

a motion compensated prediction unit configured to detect a second motion vector corresponding to the coding target block for the composite reference block by searching the specific region in the composite reference block, extract a block of the same size as the coding target block from the composite reference block using the second motion vector, and set the extracted block as a prediction block; and a coding unit configured to code a prediction difference block that the prediction block has been subtracted from the coding target block, and the second motion vector, wherein the reference image composition unit includes an inter-reference image motion vector detector configured to detect a third motion vector between the first reference block and a second reference image being another reference image, and the reference image composition unit calculates an average value or weighted average value on a pixel basis between a second reference block extracted from the second reference image using the third motion vector, and the first reference block to create the composite reference block.

3. The video coding apparatus according to claim 2, wherein the inter-reference image motion vector detector detects a plurality of the third motion vectors between the first reference block and the second reference image in units of blocks smaller than the first reference block, and the reference image composition unit combines a plurality of the second reference blocks in units of small blocks, the second reference blocks having been extracted from the second reference image using the plurality of the third motion vectors, and calculates an average value or weighted average value in between with the first reference block on a pixel basis, and accordingly creates the composite reference block.

4. The video coding apparatus according to claim 2, wherein the inter-reference image motion vector detector searches within a predetermined range for motion, centering a motion vector value that the first motion vector has been converted in accordance with two of a first time difference between the first reference image and the coding target block and a second time difference between the second reference image and the coding target block, to detect the third motion vector.

5. A video coding method, comprising:

detecting a first motion vector from a first reference image for a coding target block;

creating a composite reference block that a first reference block of a specific region having a size equal to the coding target block or larger, the first reference block having been extracted from the first reference image using the first motion vector, has been composited with a predetermined region of at least one of other reference images;

detecting a second motion vector corresponding to the coding target block for the composite reference block by searching the specific region in the composite reference block, extracting a block of the same size as the coding target block from the composite reference block using the second motion vector, and setting the extracted block as a prediction block; and coding a prediction difference block that the prediction block has been subtracted from the coding target block, and the second motion vector, wherein the accuracy of the first motion vector is N pixel accuracy (N is a real number), and the accuracy of the second motion vector is M pixel accuracy (M is a real number: M<N), and the specific region has a region equal to a target block±N/2 pixel or more, relative to a position in the first reference image, the position being pointed by the first motion vector or a vector value that has converted the first motion vector to N pixel accuracy (N is a real number), and a range to detect the second motion vector is within a range of ±N/2 with respect to the first motion vector value.

6. A non-transitory computer readable medium storing a computer program for video coding to cause a computer to realize functions comprising:

detecting a first motion vector from a first reference image for a coding target block;

creating a composite reference block that a first reference block of a specific region having a size equal to the coding target block or larger, the first reference block having been extracted from the first reference image using the first motion vector, has been composited with a predetermined region of at least one of other reference images;

detecting a second motion vector corresponding to the coding target block for the composite reference block by searching the specific region in the composite reference block, extracting a block of the same size as the coding target block from the composite reference block using the second motion vector, and setting the extracted block as a prediction block; and coding a prediction difference block that the prediction block has been subtracted from the coding target block, and the second motion vector, wherein the accuracy of the first motion vector is N pixel accuracy (N is a real number), and the accuracy of the second motion vector is M pixel accuracy (M is a real number: M<N), and the specific region has a region equal to a target block±N/2 pixel or more, relative to a position in the first reference image, the position being pointed by the first motion vector or a vector value that has converted the first motion vector to N pixel accuracy (N is a real number), and a range to detect the second motion vector is within a range of ±N/2 with respect to the first motion vector value.

7. A video decoding apparatus comprising:
a motion vector decoder configured to decode a first motion vector for a decoding target block from a coded stream;
a motion vector separation unit configured to create a second motion vector based on the first motion vector;
a reference image composition unit configured to create a composite reference block that a first reference block of a specific region having a size equal to the decoding target block or larger, the first reference block having been extracted from a first reference image using the second motion vector, has been composited with a predetermined region of at least one of other reference images;
a motion compensated prediction unit configured to extract a block of the same size as the decoding target block from the composite reference block using the first motion vector and set the extracted block as a prediction block; and
a decoding unit configured to create a decoded image by adding the prediction block and a prediction difference block decoded from the decoding target block, wherein
in the motion vector separation unit, the accuracy of the inputted first motion vector is M pixel accuracy (M is a real number), the accuracy of the second motion vector to be created is N pixel accuracy (N is a real number: N>M), and the second motion vector is a value that the first motion vector has been converted to N pixel accuracy, and
the specific region has a region of a target block±N/2 pixel or more, relative to the position in the first reference image, the position being pointed by the second motion vector.

8. A video decoding apparatus comprising:
a motion vector decoder configured to decode a first motion vector for a decoding target block from a coded stream;
a motion vector separation unit configured to create a second motion vector based on the first motion vector;
a reference image composition unit configured to create a composite reference block that a first reference block of a specific region having a size equal to the decoding target block or larger, the first reference block having been extracted from a first reference image using the second motion vector, has been composited with a predetermined region of at least one of other reference images;
a motion compensated prediction unit configured to extract a block of the same size as the decoding target block from the composite reference block using the first motion vector and set the extracted block as a prediction block; and
a decoding unit configured to create a decoded image by adding the prediction block and a prediction difference block decoded from the decoding target block, wherein
the reference image composition unit includes an inter-reference image motion vector detector configured to detect a third motion vector between the first reference block and a second reference image being another reference image, and
the reference image composition unit calculates an average value or weighted average value on a pixel basis between a second reference block extracted from the second reference image using the third motion vector, and the first reference block to create the composite reference block.

9. The video decoding apparatus according to claim 8, wherein
the inter-reference image motion vector detector detects a plurality of the third motion vectors between the first reference block and the second reference image in units of blocks smaller than the first reference block, and
the reference image composition unit combines a plurality of the second reference blocks in units of small blocks, the second reference blocks having been extracted from the second reference image using the plurality of the third motion vectors, and calculates an average value or weighted average value in between with the first reference block on a pixel basis, and accordingly creates the composite reference block.

10. The video decoding apparatus according to claim 8, wherein
the inter-reference image motion vector detector searches within a predetermined range for motion, centering a motion vector value that the second motion vector has been converted in accordance with two of a first time difference between the first reference image and the decoding target block and a second time difference between the second reference image and the decoding target block, to detect the third motion vector.

11. A video decoding method comprising:
decoding a first motion vector for a decoding target block from a coded stream;
creating a second motion vector based on the first motion vector;
creating a composite reference block that a first reference block of a specific region having a size equal to the decoding target block or larger, the first reference block having been extracted from a first reference image using the second motion vector, has been composited with a predetermined region of at least one of other reference images;
extracting a block of the same size as the decoding target block from the composite reference block using the first motion vector, and setting the extracted block as a prediction block; and
creating a decoded image by adding the prediction block and a prediction difference block decoded from the decoding target block, wherein
in the motion vector separation unit, the accuracy of the inputted first motion vector is M pixel accuracy (M is a real number), the accuracy of the second motion vector to be created is N pixel accuracy (N is a real number: N>M), and the second motion vector is a value that the first motion vector has been converted to N pixel accuracy, and
the specific region has a region of a target block±N/2 pixel or more, relative to the position in the first reference image, the position being pointed by the second motion vector.

12. A non-transitory computer readable medium storing a computer program for video decoding to cause a computer to realize functions comprising:
decoding a first motion vector for a decoding target block from a coded stream;
creating a second motion vector based on the first motion vector;
creating a composite reference block that a first reference block of a specific region having a size equal to the decoding target block or larger, the first reference block having been extracted from a first reference image using the second motion vector, has been composited with a predetermined region of at least one of other reference images;

extracting a block of the same size as the decoding target block from the composite reference block using the first motion vector, and setting the extracted block as a prediction block; and creating a decoded image by adding the prediction block and a prediction difference block decoded from the decoding target block, wherein in the motion vector separation unit, the accuracy of the inputted first motion vector is M pixel accuracy (M is a real number), the accuracy of the second motion vector to be created is N pixel accuracy (N is a real number: N>M), and the second motion vector is a value that the first motion vector has been converted to N pixel accuracy, and the specific region has a region of a target block±N/2 pixel or more, relative to the position in the first reference image, the position being pointed by the second motion vector.

* * * * *